(12) United States Patent
Kawano

(10) Patent No.: US 12,155,303 B2
(45) Date of Patent: Nov. 26, 2024

(54) SWITCHING CONVERTER INCLUDING CONTROLLER CIRCUIT DRIVING SWITCHES

(71) Applicant: ROHM CO., LTD., Kyoto (JP)

(72) Inventor: Akihiro Kawano, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 194 days.

(21) Appl. No.: 17/865,545

(22) Filed: Jul. 15, 2022

(65) Prior Publication Data

US 2023/0013485 A1 Jan. 19, 2023

(30) Foreign Application Priority Data

Jul. 15, 2021 (JP) ................................. 2021-117343
Jul. 16, 2021 (JP) ................................. 2021-118074
Jul. 16, 2021 (JP) ................................. 2021-118076

(51) Int. Cl.
*H02M 3/158* (2006.01)
*H02M 1/00* (2006.01)
*H02M 3/07* (2006.01)

(52) U.S. Cl.
CPC ......... *H02M 3/158* (2013.01); *H02M 1/0095* (2021.05); *H02M 3/07* (2013.01)

(58) Field of Classification Search
CPC .. H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 2003/1557; H02J 3/46; H02J 3/38; G05F 1/00; G05F 1/10; G05F 1/12; G05F 1/46; G05F 1/455; G05F 1/45; G05F 1/445;
(Continued)

(56) References Cited

U.S. PATENT DOCUMENTS 7,696,735 B2 4/2010 Oraw et al.
10,389,237 B1 * 8/2019 Chee ...................... H02M 3/158
(Continued)

FOREIGN PATENT DOCUMENTS

JP 2016226257 A 12/2016
JP 2020188670 A 11/2020

*Primary Examiner* — Thienvu V Tran
*Assistant Examiner* — Nusrat Quddus
(74) *Attorney, Agent, or Firm* — CANTOR COLBURN LLP

(57) ABSTRACT

An inductor is connected between a switching node and an output line. The first switch and the second switch are connected in series between an input line and a ground line. A third switch is connected between the switching node and the input line. A flying capacitor is connected across the third switch and the first switch. A controller IC drives the first switch to the third switch.

15 Claims, 30 Drawing Sheets

(58) Field of Classification Search
CPC ..... G05F 1/66; G05F 1/40; G05F 1/42; G05F
1/44; G05F 1/462; G05F 1/52; G05F
1/56; G05F 3/10; G05F 3/16; G05F 3/18;
G05F 3/185; G05F 3/20; G05F 3/26;
G05F 3/30; G05F 3/205; G05F 3/22;
G05F 3/24; G05F 3/222; G05F 3/242;
G05F 3/225; G05F 3/227; G05F 3/245;
G05F 3/247; G05F 3/262; G05F 3/265;
G05F 3/267; G05F 1/575; H05B 39/048;
B23K 11/24; H04B 2215/069
See application file for complete search history.

(56) References Cited

U.S. PATENT DOCUMENTS

| | | | |
|---|---|---|---|
| 11,451,151 B1* | 9/2022 | Liu | H02M 3/07 |
| 11,923,765 B2* | 3/2024 | Szczeszynski | H02M 1/32 |
| 2016/0315539 A1* | 10/2016 | Lee | H02M 1/088 |
| 2019/0252974 A1* | 8/2019 | Meyvaert | H02M 3/07 |
| 2019/0280618 A1* | 9/2019 | Yan | H02M 3/158 |
| 2020/0144909 A1* | 5/2020 | Baek | H02M 3/156 |
| 2020/0228003 A1* | 7/2020 | Baek | H02M 3/156 |
| 2021/0083572 A1* | 3/2021 | Yen | H02J 7/06 |
| 2022/0231618 A1* | 7/2022 | Yan | H02M 3/1584 |
| 2022/0302827 A1* | 9/2022 | Tarroboiro | H02M 3/158 |
| 2022/0378603 A1* | 12/2022 | Devlin | A61K 45/06 |
| 2023/0122225 A1* | 4/2023 | Mercer | H02M 3/158 |
| | | | 323/271 |
| 2023/0318460 A1* | 10/2023 | Cheng | H02M 1/0043 |
| | | | 323/272 |
| 2023/0361673 A1* | 11/2023 | Takobe | H02M 1/088 |

* cited by examiner

SWITCHING CONVERTER INCLUDING CONTROLLER CIRCUIT DRIVING SWITCHES

CROSS REFERENCES TO RELATED APPLICATIONS

The present invention claims priority under 35 U.S.C. § 119 to Japanese Application No. 2021-117343, filed on Jul. 15, 2021; Japanese Application No. 2021-118074 filed on Jul. 16, 2021; and Japanese Application No. 2021-118076, filed on Jul. 16, 2021, the entire contents of all three of which are incorporated herein by reference.

BACKGROUND

1. Technical Field

The present disclosure relates to a switching converter or a step-up/down converter.

2. Description of the Related Art

A step-up (boost) converter is used to generate a voltage higher than a power supply voltage. The step-up converter may step up the input voltage $V_{IN}$ to any voltage level according to the duty cycle of the switching.

The step-up converter has a transfer function of right half plane zero (RHPZ). RHPZ creates various constraints in applications with large inductor values and large output electric currents.

SUMMARY

The present disclosure has been made in such a situation, and one general exemplary object thereof is to provide a switching converter without RHPZ.

1. A switching converter according to an embodiment of the present disclosure includes: an input line, an output line, a ground line, a switching node, an inductor connected between the switching node and the output line, an output capacitor connected to the output line, a first switch and a second switch connected in series between the input line and the ground line, a third switch connected between the switching node and the input line, a flying capacitor connected across the third switch and the first switch, and a controller circuit structured to drive the first switch to the third switch.

Another embodiment of the present disclosure is a controller circuit of a switching converter. The switching converter includes: an input line, an output line, a ground line, a switching node, an inductor connected between the switching node and the output line, an output capacitor connected to the output line, a first switch and a second switch connected in series between the input line and the ground line, a third switch connected between the switching node and the input line, and a flying capacitor connected across the third switch and the first switch. The controller circuit includes: a state control unit structured to alternately repeat a first state in which the second switch and the third switch are turned on and the first switch is turned off and a second state in which the second switch and the third switch are turned off and the first switch is turned on, and a drive circuit structured to drive the first switch to the third switch according to an output of the state control unit.

Still another embodiment of the present disclosure is a switching converter. This switching converter includes: an input line, an output line, a ground line, a switching node, an inductor connected between the switching node and the output line, an output capacitor connected to the output line, a first switch and a second switch connected in series between the input line and the ground line, a third switch and a fourth switch connected in series between the input line and the switching node, a flying capacitor connected across the third switch and the first switch, a fifth switch connected between the switching node and the ground line, and a controller circuit structured to drive the first switch to the fifth switch.

Still another embodiment of the present disclosure is a controller circuit of a switching converter. The switching converter includes: an input line, an output line, a ground line, a switching node, an inductor connected between a switching node and the output line, an output capacitor connected to the output line, a first switch and a second switch connected in series between the input line and the ground line, a third switch and a fourth switch connected in series between the input line and the switching node, a flying capacitor connected across the third switch and the first switch, and a fifth switch connected between the switching node and the ground line. The controller circuit includes: a state control unit structured to alternately repeat a first state in which the first switch, the fourth switch are turned off, the second switch, the third switch, and the fifth switch are turned on and a second state in which the first switch, the fourth switch are turned on, the second switch, the third switch, and the fifth switch are turned off, and a drive circuit structured to drive the first switch to the fifth switch according to an output of the state control unit.

2. An embodiment of the present disclosure relates to a controller circuit for a step-up/down converter. The step-up/down converter to be controlled includes: an input line, an output line, a ground line, an inductor, a first transistor connected between the input line and a first end of the inductor, a second transistor connected between the first end of the inductor and the ground line, a third transistor connected between a second end of the inductor and the ground line, and a fourth transistor connected between the second end of the inductor and the output line. The controller circuit includes: a state control unit structured to repeat, in a step-up mode, (i) a first state in which a first transistor is turned on, a second transistor is turned off, a third transistor is turned on, and a fourth transistor is turned off; (ii) a second state in which the first transistor is turned on, the second transistor is turned off, the third transistor is turned off, and the fourth transistor is turned on; and (iii) a third state in which the first transistor is turned off, the second transistor is turned on, the third transistor is turned on, and the fourth transistor is turned off; and a drive circuit structured to drive the first transistor to the fourth transistor according to an output of the state control unit.

3. An embodiment of the present disclosure relates to a switching converter. The switching converter includes: an input line, an output line, a ground line, a first transistor, a second transistor, a third transistor, and a fourth transistor connected in series between the input line and the ground line, a first capacitor connected between a connection node of the second transistor and the third transistor and the ground line, a second capacitor connected between a connection node of the first transistor and the second transistor and a connection node of the third transistor and the fourth transistor, a first inductor connected between a connection node of the third transistor and the fourth transistor and the output line, an output capacitor connected to the output line, a second inductor provided on a loop that returns from the ground line to the ground line via the fourth transistor, the second capacitor, the second transistor, and the first capacitor, and a controller circuit structured to drive the first transistor to the fourth transistor.

Another embodiment of the present disclosure is a controller circuit of a switching converter. The switching converter includes: an input line; an output line; a ground line; a first transistor, a second transistor, a third transistor, and a fourth transistor connected in series between the input line and the ground line; a first capacitor connected between a connection node of the second transistor and the third transistor and the ground line; a second capacitor connected between a connection node of the first transistor and the second transistor and a connection node of the third transistor and the fourth transistor; a first inductor connected between a connection node of the third transistor and the fourth transistor and the output line; an output capacitor connected to the output line; and a second inductor provided on a loop returning from the ground line to the ground line via the fourth transistor, the second capacitor, the second transistor, and the first capacitor.

It is to be noted that any arbitrary combination or rearrangement of the above-described structural components and so forth is effective as and encompassed by the present embodiments. Moreover, this summary does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overview of Embodiment

Figure 1:
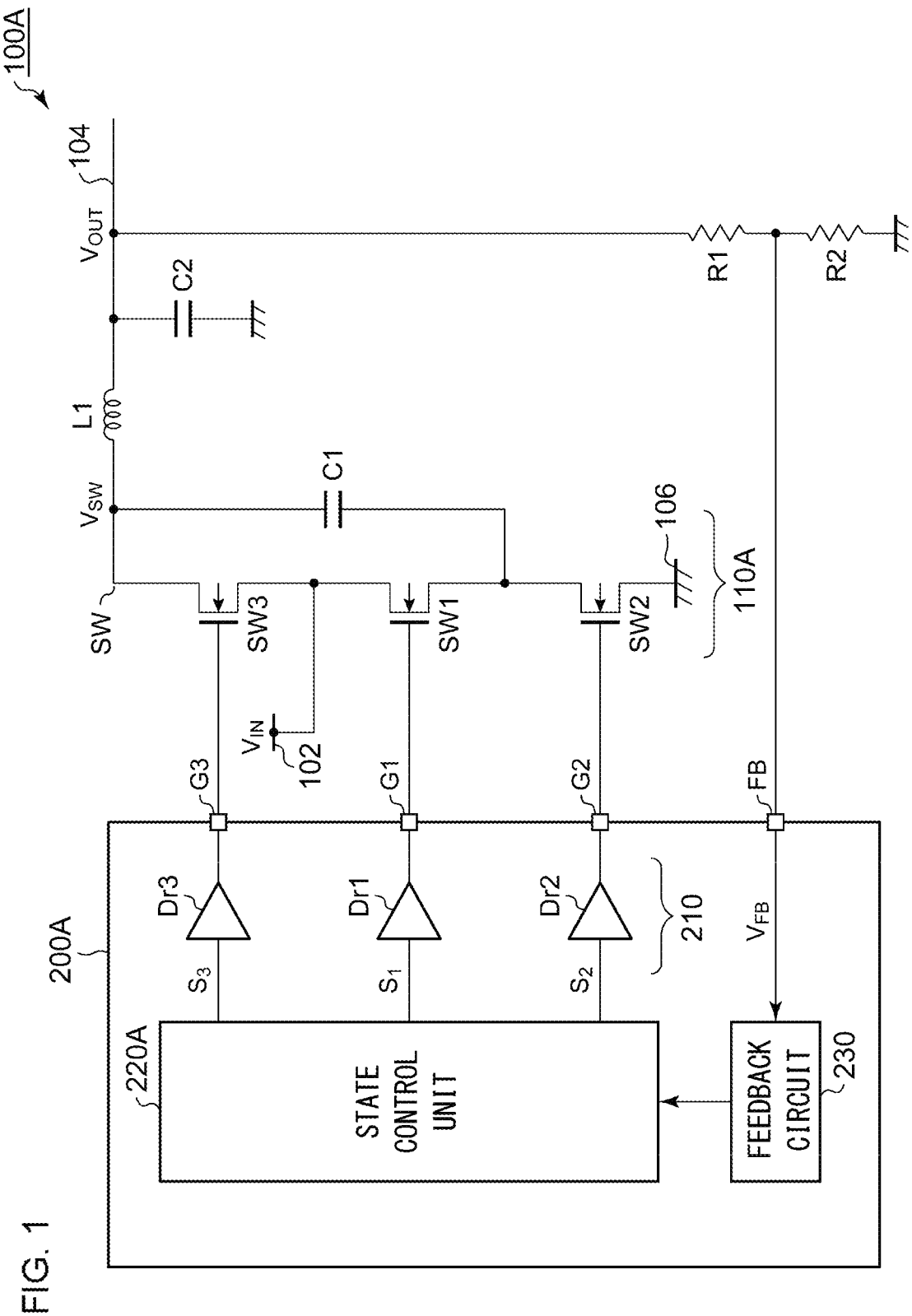
FIG. 1 is a circuit diagram of a switching converter according to Embodiment 1.1.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

1. A switching converter according to one embodiment includes: an input line, an output line, a ground line, a switching node, an inductor connected between the switching node and the output line, an output capacitor connected to the output line, a first switch and a second switch connected in series between the input line and the ground line, a third switch connected between the switching node and the input line, a flying capacitor connected across the third switch and the first switch, and a controller circuit structured to drive the first switch to the third switch.

According to this configuration, the voltage of the switching node can be switched with two voltages of $2 \times V_{IN}$ and $V_{IN}$, and according to the duty cycle of the switching, the output voltage $V_{OUT}$ can be changed in a range of $V_{IN}$ to $2 \times V_{IN}$, so that the step-up operation can be realized. On the other hand, since the switching converter has a step-down topology, there is no RHPZ.

In addition, in the normal step-up converter, the efficiency is improved when the step-up ratio is closer to 1, but in the above-described configuration, the efficiency is improved when the step-up ratio is close to two times. Therefore, in the case of operating at a step-up ratio close to 2, the efficiency can also be improved as compared with the conventional step-up converter.

In one embodiment, the controller circuit may alternately repeat a first state in which the second switch and the third switch are turned on and the first switch is turned off, and a second state in which the second switch and the third switch are turned off and the first switch is turned on. In the first state, the flying capacitor is charged with the input voltage $V_{IN}$. In the second state, the voltage $Vc(=V_{IN})$ of the flying capacitor is added to the input voltage $V_{IN}$, and a voltage of $2 \times V_{IN}$ can be generated in the switching node.

In one embodiment, the first to third switches may be N-channel MOSFETs.

A controller circuit according to one embodiment controls a switching converter. The switching converter to be controlled includes: an input line, an output line, a ground line, a switching node, an inductor connected between the switching node and the output line, an output capacitor connected to the output line, a first switch and a second switch connected in series between the input line and the ground line, a third switch connected between the switching node and the input line, and a flying capacitor connected across the third switch and the first switch. The controller circuit includes: a state control unit structured to alternately repeat a first state in which the second switch and the third switch are turned on and the first switch is turned off and a second state in which the second switch and the third switch are turned off and the first switch is turned on, and a drive circuit structured to drive the first switch to the third switch according to an output of the state control unit.

According to this configuration, the voltage of the switching node can be switched with two voltages of $2 \times V_{IN}$ and $V_{IN}$. According to the duty cycle of the switching, the output voltage $V_{OUT}$ can be changed in the range of $V_{IN}$ to $2 \times V_{IN}$, thus realizing a step-up operation. On the other hand, since the switching converter has a step-down topology, there is no RHPZ, and thus phase compensation of the controller circuit is easier than that of the step-up converter.

A switching converter according to one embodiment includes: an input line, an output line, a ground line, a switching node, an inductor connected between the switching node and the output line, an output capacitor connected to the output line, a first switch and a second switch connected in series between the input line and the ground line, a third switch and a fourth switch connected in series between the input line and the switching node, a flying capacitor connected across the third switch and the first switch, a fifth switch connected between the switching node and the ground line, and a controller circuit structured to drive the first switch to the fifth switch.

According to this configuration, the voltage of the switching node can be switched with two voltages of $2 \times V_{IN}$ and 0 V, and the output voltage $V_{OUT}$ can be changed in the range of 0 to $2 \times V_{IN}$ according to the duty cycle of the switching, so that the step-up/down operation (step-down operation and step-up operation) can be realized. On the other hand, since the switching converter has a step-down topology, there is no RHPZ.

In addition, in the normal step-up converter, the efficiency is improved when the step-up ratio is closer to 1, but in the above-described configuration, the efficiency is improved when the step-up ratio is close to two times. Therefore, in the case of operating at a step-up ratio close to 2, the efficiency can also be improved as compared with the conventional step-up converter.

In one embodiment, the controller circuit may alternately repeat a first state in which the first switch and the fourth switch are turned off and the second switch, the third switch, and the fifth switch are turned on, and a second state in which the first switch and the fourth switch are turned on and the second switch, the third switch, and the fifth switch are turned off. In the first state, the flying capacitor is charged with the input voltage $V_{IN}$, and 0 V is generated in the switching node. In the second state, the voltage $Vc(=V_{IN})$ of the flying capacitor is added to the input voltage $V_{IN}$, and a voltage of $2 \times V_{IN}$ can be generated in the switching node.

In one embodiment, the first to fifth switches may be N-channel MOSFETs.

A controller circuit according to one embodiment controls a switching converter. The switching converter to be controlled includes: an input line, an output line, a ground line, a switching node, an inductor connected between a switching node and the output line, an output capacitor connected to the output line, a first switch and a second switch connected in series between the input line and the ground line, a third switch and a fourth switch connected in series between the input line and the switching node, a flying capacitor connected across the third switch and the first switch, and a fifth switch connected between the switching node and the ground line. The controller circuit includes: a state control unit structured to alternately repeat a first state in which the first switch, the fourth switch are turned off, the second switch, the third switch, and the fifth switch are turned on and a second state in which the first switch, the fourth switch are turned on, the second switch, the third switch, and the fifth switch are turned off, and a drive circuit structured to drive the first switch to the fifth switch according to an output of the state control unit.

According to this configuration, the voltage of the switching node can be switched with two voltages of $2 \times V_{IN}$ and 0 V. According to the duty cycle of the switching, the output voltage $V_{OUT}$ can be changed in the range of 0 to $2 \times V_{IN}$, thus realizing a step-up/down operation. On the other hand, since the switching converter has a step-down topology, there is no RHPZ, and thus phase compensation of the controller circuit is easier than that of the step-up/down converter.

In one embodiment, the controller circuit may be monolithically integrated on one semiconductor substrate. The term "monolithically integrated" includes a case where all components of a circuit are formed on a semiconductor substrate and a case where main components of the circuit are monolithically integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

2. A step-up/down (buck-boost) converter is used to generate a voltage higher than a power supply voltage. The step-up/down converter can step down or step up the input voltage $V_{IN}$ to an arbitrary voltage level according to a duty cycle of switching.

The step-up/down converter has a transfer function of right half plane zero (RHPZ). The RHPZ creates various constraints in applications where the inductor has a large value and the output electric current is large, and thus a solution is desired.

An embodiment of the present disclosure relates to a controller circuit of a step-up/down converter. The step-up/down converter includes: an input line, an output line, a ground line, an inductor, a first transistor connected between the input line and the first end of the inductor, a second transistor connected between the first end of the inductor and the ground line, a third transistor connected between the second end of the inductor and the ground line, and a fourth transistor connected between the second end of the inductor and the output line. The controller circuit includes: a state control unit structured to repeat, in a step-up mode, (i) a first state in which a first transistor is turned on, a second transistor is turned off, a third transistor is turned on, and a fourth transistor is turned off; (ii) a second state in which the first transistor is turned on, the second transistor is turned off, the third transistor is turned off, and the fourth transistor is turned on; and (iii) a third state in which the first transistor is turned off, the second transistor is turned on, the third transistor is turned on, and the fourth transistor is turned off; and a drive circuit structured to drive the first transistor to the fourth transistor according to an output of the state control unit.

According to this configuration, in the third state, the first end and the second end of the inductor are connected to the ground line, and the voltage across the inductor becomes zero. As a result, a section in which the coil current $I_L$ flowing through the inductor does not change is inserted. As a result, the term of RHPZ can be deleted from the transfer function between the input and output of the step-up/down converter.

In one embodiment, the state control unit may repeat, in the step-down mode, (iv) a fourth state in which the first transistor is turned on, the second transistor is turned off, the third transistor is turned off, and the fourth transistor is turned on, (v) a fifth state in which the first transistor is turned off, the second transistor is turned on, the third transistor is turned off, and the fourth transistor is turned on, and (vi) a sixth state in which the first transistor is turned off, the second transistor is turned on, the third transistor is turned on, and the fourth transistor is turned off. In the step-down mode, the design of the state control unit can be made common by performing state transition in three states similarly to the step-up mode.

In one embodiment, in the step-down mode, the state control unit may repeat (iv) a fourth state in which the first transistor is turned on, the second transistor is turned off, the third transistor is turned off, and the fourth transistor is turned on, and (v) a fifth state in which the first transistor is turned off, the second transistor is turned on, the third transistor is turned off, and the fourth transistor is turned on.

In one embodiment, the controller circuit may be monolithically integrated on one semiconductor substrate. The term "monolithically integrated" includes a case where all components of a circuit are formed on a semiconductor substrate and a case where main components of the circuit are monolithically integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

3. A DC/DC converter (switching converter) is used to generate a voltage lower or higher than a power supply voltage. The step-down converter generally has high efficiency in a region where the step-down ratio is close to 1 and has low efficiency in a region where the step-down ratio is low, that is, in a region where the output voltage is low. In order to solve this problem, a hybrid configuration (referred to as a hybrid DC/DC converter) in which a capacitor is added to a DC/DC converter has been proposed. In this configuration, the capacitor is used to generate the switching voltage having the amplitude of ½ times the input voltage, so that the efficiency can be improved as compared with the normal buck converter.

A switching converter according to one embodiment includes: an input line; an output line; a ground line; a first transistor, a second transistor, a third transistor, and a fourth transistor connected in series between the input line and the ground line; a first capacitor connected between a connection node of the second transistor and the third transistor and the ground line; a second capacitor connected between a connection node of the first transistor and the second transistor and a connection node of the third transistor and the fourth transistor; a first inductor connected between a connection node of the third transistor and the fourth transistor and the output line; an output capacitor connected to the output line; a second inductor provided on a loop that returns from the ground line to the ground line via the fourth transistor, the second capacitor, the second transistor, and the first capacitor; and a controller circuit structured to drive the first transistor to the fourth transistor, wherein.

According to this configuration, when the first capacitor and the second capacitor are connected in parallel and the charge is transferred from the second capacitor to the first capacitor, the charging current is limited by the second inductor. As a result, it is possible to suppress a sharp increase in the charging current and to reduce the switching loss.

In one embodiment, the second inductor may be connected in series with the second capacitor across the second transistor and the third transistor.

In one embodiment, the second inductor may be connected in series with the first capacitor between the connection node of the second transistor and the third transistor and the ground line.

In one embodiment, the inductance of the second inductor may be less than the inductance of the first inductor.

In one embodiment, the first to fourth transistors may be N-channel MOSFETs (Metal Oxide Semiconductor Field Effect Transistor).

In one embodiment, the controller circuit may alternately repeat a first state in which the first transistor and the third transistor are turned on and the second transistor and the fourth transistor are turned off, and a second state in which the first transistor and the third transistor are turned off and the second transistor and the fourth transistor are turned on.

In one embodiment, the length of the second state may be approximately ½ times the natural period that is the reciprocal of the resonant frequency of the LC resonant circuit formed by the first capacitor, the second capacitor, and the second inductor. Accordingly, since the resonant operation is realized, the efficiency can be enhanced. "Approximately ½ times" is intended to include not only a case where the ratio is completely ½ times but also a case where the ratio deviates from ½ within a range in which the resonant operation can be realized, and for example, refers to a range of ½ to ±20%.

A controller circuit according to one embodiment controls a switching converter. A switching converter includes: an input line, an output line, a ground line, a first transistor, a second transistor, a third transistor, and a fourth transistor connected in series between the input line and the ground line, a first capacitor connected between a connection node of the second transistor and the third transistor and the ground line, a connection node of the first transistor and the second transistor, a second capacitor connected between a connection node of the third transistor and the fourth transistor, a first inductor connected between a connection node of the third transistor and the fourth transistor and the output line, an output capacitor connected to the output line, and a second inductor provided on a loop returning from the ground line to the ground line via the fourth transistor, the second capacitor, the second transistor, and the first capacitor. The controller circuit includes: a state control unit structured to alternately repeat a first state in which the first transistor and the third transistor are turned on and the second transistor and the fourth transistor are turned off and a second state in which the first transistor and the third transistor are turned off and the second transistor and the fourth transistor are turned on; and a drive circuit structured to drive the first transistor to the fourth transistor according to an output of the state control unit.

In one embodiment, the length of the second state may be approximately ½ times the natural period that is the reciprocal of the resonant frequency of the LC resonant circuit formed by the first capacitor, the second capacitor, and the second inductor.

In one embodiment, the controller circuit may be monolithically integrated on one semiconductor substrate. The term "monolithically integrated" includes a case where all components of a circuit are formed on a semiconductor substrate and a case where main components of the circuit are monolithically integrated, and some resistors, capacitors, and the like may be provided outside the semiconductor substrate for adjustment of circuit constants. By integrating the circuits on one chip, the circuit area can be reduced, and the characteristics of the circuit elements can be kept uniform.

Embodiment

Hereinafter, preferred embodiments will be described with reference to the drawings. For each embodiment, the same or equivalent components, members, and processes are denoted by the same reference numerals, and redundant description will be omitted as appropriate. Further, the embodiments are not intended to limit the disclosure and the invention, but are merely examples, and all features described in the embodiments and combinations thereof are not necessarily essential to the disclosure and the invention.

In the present specification, "a state in which a member A is connected to a member B" includes not only a case where the member A and the member B are physically and directly connected to each other, but also a case where the member A and the member B are indirectly connected to each other via another member which does not substantially affect an electrical connection state between the member A and the member B or which does not impair a function or an effect exhibited by the connection between the member A and the member B.

Similarly, "a state in which a member C is provided between the member A and the member B" includes not only a case where the member A and the member C, or the member B and the member C are directly connected to each other, but also a case where the members are indirectly connected to each other via another member which does not substantially affect an electrical connection state between the members or which does not impair a function or an effect exhibited by the connection between the members.

In addition, "signal A (voltage, current) corresponds to signal B (voltage, current) means that the signal A has a correlation with the signal B. Specifically, it means (i) the signal A is the signal B, (ii) the signal A is proportional to the signal B, (iii) the signal A is obtained by level-shifting the signal B, (iv) the signal A is obtained by amplifying the signal B, (v) the signal A is obtained by inverting the signal B, or (vi) any combination thereof. It is understood by a person skilled in the art that the range of "corresponding to" is determined by the types and applications of the signals A and B.

The vertical axis and the horizontal axis of the waveform diagram and the time chart referred to in the present specification are appropriately enlarged and reduced for easy understanding, and each waveform shown is simplified or exaggerated or emphasized for easy understanding.

Embodiment 1.1

FIG. 1 is a circuit diagram of a switching converter 100A according to Embodiment 1.1. The switching converter 100A steps up an input voltage $V_{IN}$ of an input line 102 and generates a stepped-up output voltage $V_{OUT}$ in an output line 104. The switching converter 100A includes a flying capacitor C1, an output capacitor C2, an inductor L1, first to third switches SW1 to SW3, resistors R1 and R2, and a controller integrated circuit (IC) 200A.

The inductor L1 is connected between the switching node SW and the output line 104. The output capacitor C2 is connected to the output line 104. The first switch SW1 and the second switch SW2 are connected in series between the input line 102 and the ground line 106. The third switch SW3 is connected between the switching node SW and the input line 102. The flying capacitor C1 is connected across the third switch SW3 and the first switch SW1. In the present embodiment, the first switch SW1 to the third switch SW3 are N-channel MOSFETs.

The first switch SW1 to the third switch SW3 and the flying capacitor C1 are referred to as a switching circuit 110A.

The controller IC 200A drives the first switch SW1 to the third switch SW3, and generates a switching voltage $V_{SW}$ having two voltage levels $V_{IN}$ and $2 \times V_{IN}$ in the switching node SW.

For example, the controller IC 200A alternately repeats the first state φ1 and the second state φ2.

First state φ1
Second switch SW2 and third switch SW3: ON
First switch SW1: OFF
Second state φ2
Second switch SW2 and third switch SW3: OFF
First switch SW1: ON The controller IC 200A includes a drive circuit 210A, a state control unit 220A, and a feedback circuit 230, and is a functional IC integrated on one semiconductor substrate. The gate pins G1 to G3 of the controller IC 200A are connected to the gates of the first switch SW1 to the third switch SW3. A feedback signal $V_{FB}$ corresponding to the output voltage $V_{OUT}$ of the switching converter 100A is fed back to the feedback pin FB of the controller IC 200A. The resistors R1 and R2 divide the output voltage $V_{OUT}$ to generate a feedback signal $V_{FB}$.

The resistors R1 and R2 may be integrated in the controller IC 200A. Further, the plurality of switches SW1 to SW3 may be integrated in the controller IC 200A.

The state control unit 220A is a control logic, generates control signals $S_1$ to $S_3$ that define on and off of the first switch SW1 to the third switch SW3, and controls the state of the switching converter 100A.

The drive circuit 210A drives the first switch SW1 to the third switch SW3 according to the outputs $S_1$ to $S_3$ of the state control unit 220A. The drive circuit 210A includes three drivers Dr1 to Dr3.

The feedback circuit 230 controls a time ratio between the first state φ1 and the second state φ2 such that an error between the feedback signal $V_{FB}$ and the reference voltage $V_{REF}$ approaches 0. The feedback circuit 230 can be configured similarly to a general DC/DC converter, and can include, for example, a pulse width modulator or a pulse frequency modulator. In addition, the control method is not particularly limited, and the controller may be a voltage mode controller and a peak current mode or average current mode controller or may be a ripple control controller. Specifically, the controller may use hysteresis control (Bang-Bang control), bottom detection on-time fixed control, or peak detection off-time fixed control.

The switching converter 100A is configured as described above. Next, the operation will be described.

Figure 2:
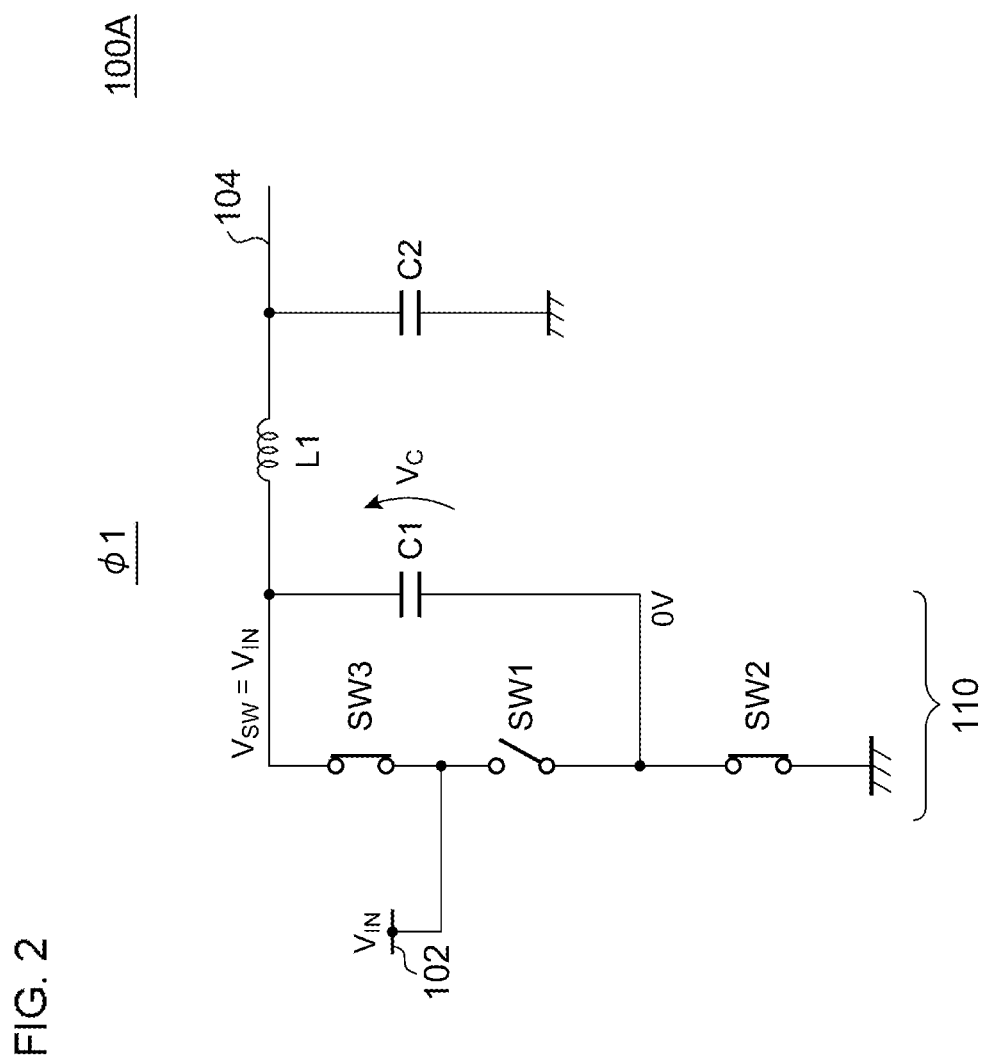
FIG. 2 is an equivalent circuit diagram in a first state of the switching converter of FIG. 1.

FIG. 2 is an equivalent circuit diagram of the first state φ1 of the switching converter 100A of FIG. 1. In the first state φ1, the second switch SW2 and the third switch SW3 are turned on, and the first switch SW1 is turned off. In the first state φ1, $V_{SW}=V_{IN}$, and the flying capacitor C1 is charged with the input voltage $V_{IN}$. That is, the voltage Vc across the flying capacitor C1 is equal to the input voltage $V_{IN}$.

A voltage $\Delta V_{L1}$ across the inductor L1 in the first state φ1 becomes $\Delta V_{L1}=V_{IN}-V_{OUT}$ and becomes a negative voltage. Therefore, the current $I_L$ of the inductor L1 decreases with time with the slope of $(V_{IN}-V_{OUT})/L$.

Figure 3:
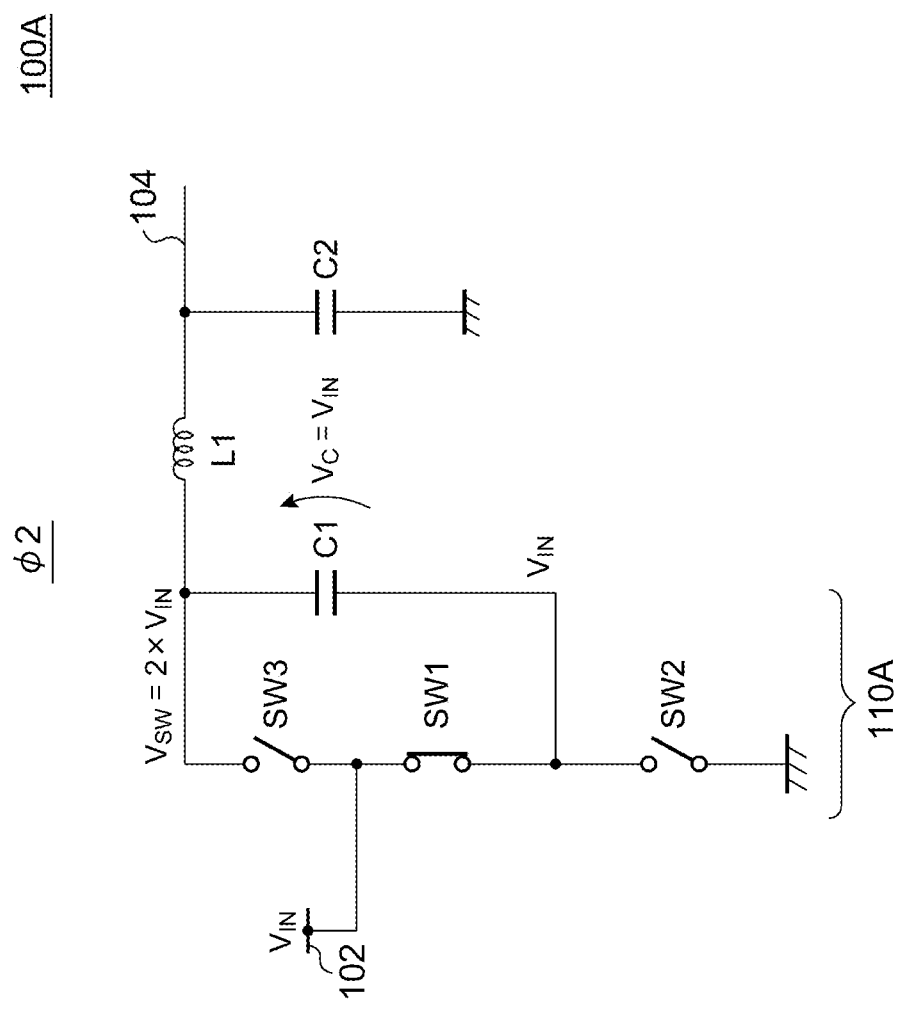
FIG. 3 is an equivalent circuit diagram in a second state of the switching converter of FIG. 1.

FIG. 3 is an equivalent circuit diagram of the second state φ2 of the switching converter 100A of FIG. 1. In the second state φ2, the second switch SW2 and the third switch SW3 are turned off, and the first switch SW1 is turned on. In the second state φ2, $V_{SW}=2\times V_{IN}$.

A voltage $\Delta V_{L2}$ across the inductor L1 in the second state φ2 becomes $\Delta V_{L2}=2\times V_{IN}-V_{OUT}$ and becomes a positive voltage. Therefore, the current $I_L$ of the inductor L1 increases with time with the slope of $(2\times V_{IN}-V_{OUT})/L$.

Figure 4:
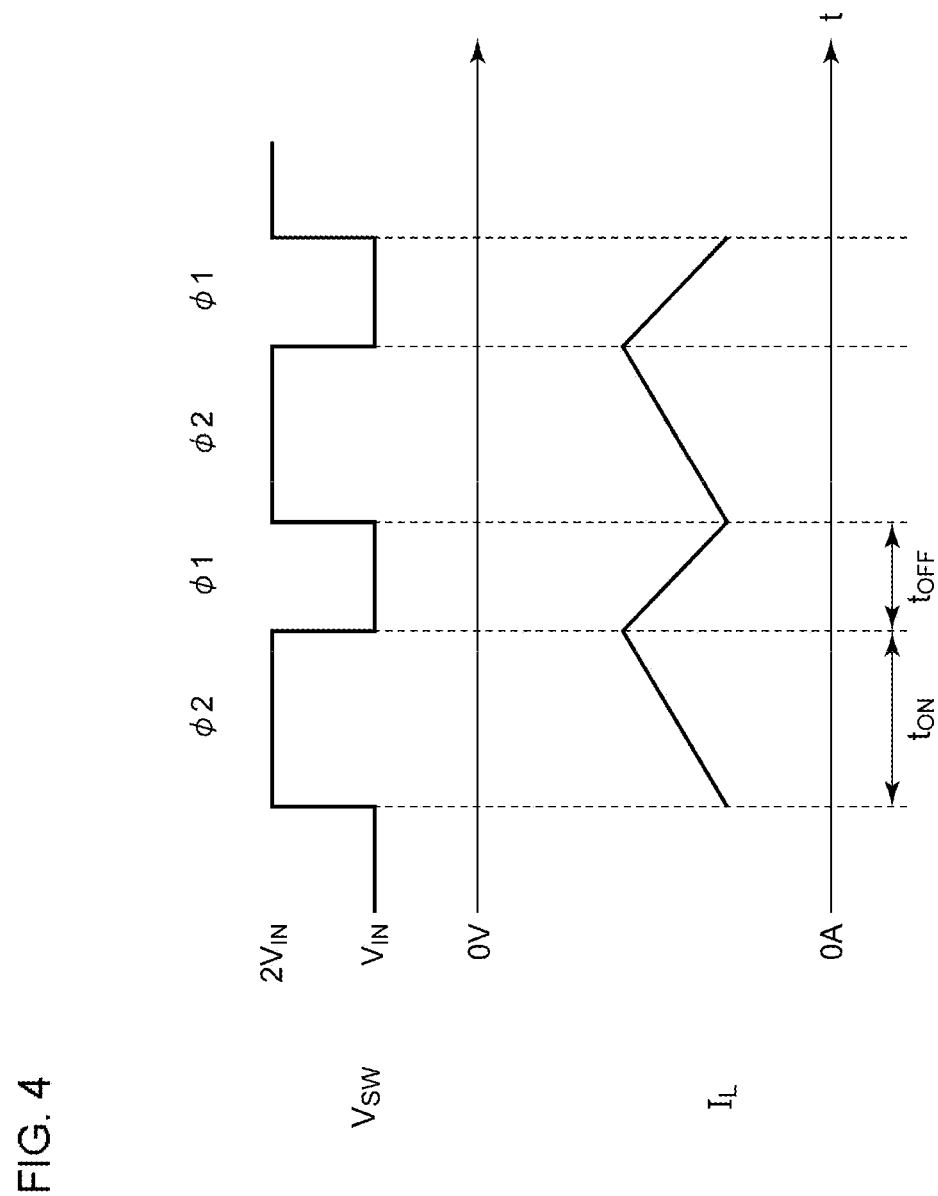
FIG. 4 is an operation waveform diagram of the switching converter of FIG. 1.

FIG. 4 is an operation waveform diagram of the switching converter 100A of FIG. 1. FIG. 4 illustrates the coil current $I_L$ flowing through the inductor L1. In the second state φ2, the coil current $I_L$ increases. When the time of the second state φ2 is $t_{ON}$, the increase amount $\Delta I_{ON}$ of the coil current $I_L$ is calculated as $$\Delta I_{ON}=(2\times V_{IN}-V_{OUT})/L\times t_{ON}.$$

In the first state the coil current $I_L$ decreases. When the time of the first state φ1 is $t_{OFF}$, the decrease amount $\Delta I_{OFF}$ (absolute value) of the coil current $I_L$ is expressed as $$\Delta I_{OFF} = |(V_{IN} - V_{OUT})|/L \times t_{OFF} = (V_{OUT}V_{IN})/L\times t_{OFF}.$$

In a steady state, when the average value of the coil current $I_L$ is constant, $\Delta I_{ON}=\Delta I_{OFF}$ is established. Therefore, Equation (1) is obtained.

$$(2\times V_{IN}-V_{OUT})/L\times t_{ON}=(V_{OUT}-V_{IN})/L\times t_{OFF} \quad (i)$$

When the Duty Cycle d is Defined as $$d=t_{ON}/(t_{ON}+t_{OFF}),$$

Equation (2) is obtained.

$$V_{OUT}=(1+d)\cdot V_{IN}$$

That is, by changing the duty cycle d in the range of 0 to 1, the output voltage $V_{OUT}$ can be changed between $V_{IN}$ and $2\times V_{IN}$, and the step-up operation can be realized.

The switching converter 100A operates as described above. Next, advantages thereof will be described.

FIG. 1 will be referenced. Comparing the switching converter 100A with a general step-down converter (buck converter), in the general step-down converter, the switching voltage $V_{SW}$ at one end of the inductor L1 switches between two voltages of 0 V and $V_{IN}$, whereas in the switching converter 100A of FIG. 1, the switching voltage $V_{SW}$ switches between $V_{IN}$ and $2\times V_{IN}$. It can be understood that the switching converter 100A is obtained by replacing the high-side transistor (switching transistor) and the low-side transistor (synchronous rectification transistor) of the step-down converter with the switching circuit 110A. That is, the switching converter 100A can perform a step-up operation, but the circuit topology is similar to that of the step-down converter and therefore the switching converter 100A does not have RHPZ. This facilitates phase compensation in designing the controller IC 200A. That is, the feedback circuit 230 of FIG. 1 can be configured similarly to the feedback circuit of the step-down converter.

In addition, in a normal step-up converter (boost converter), efficiency is improved when the step-up ratio is closer to 1, but in the switching converter 100A, efficiency is improved when the step-up ratio is closer to 2 times. Therefore, in the case of operating at a step-up ratio close to 2, the efficiency can also be improved as compared with the conventional step-up converter.

Embodiment 1.2

Figure 5:
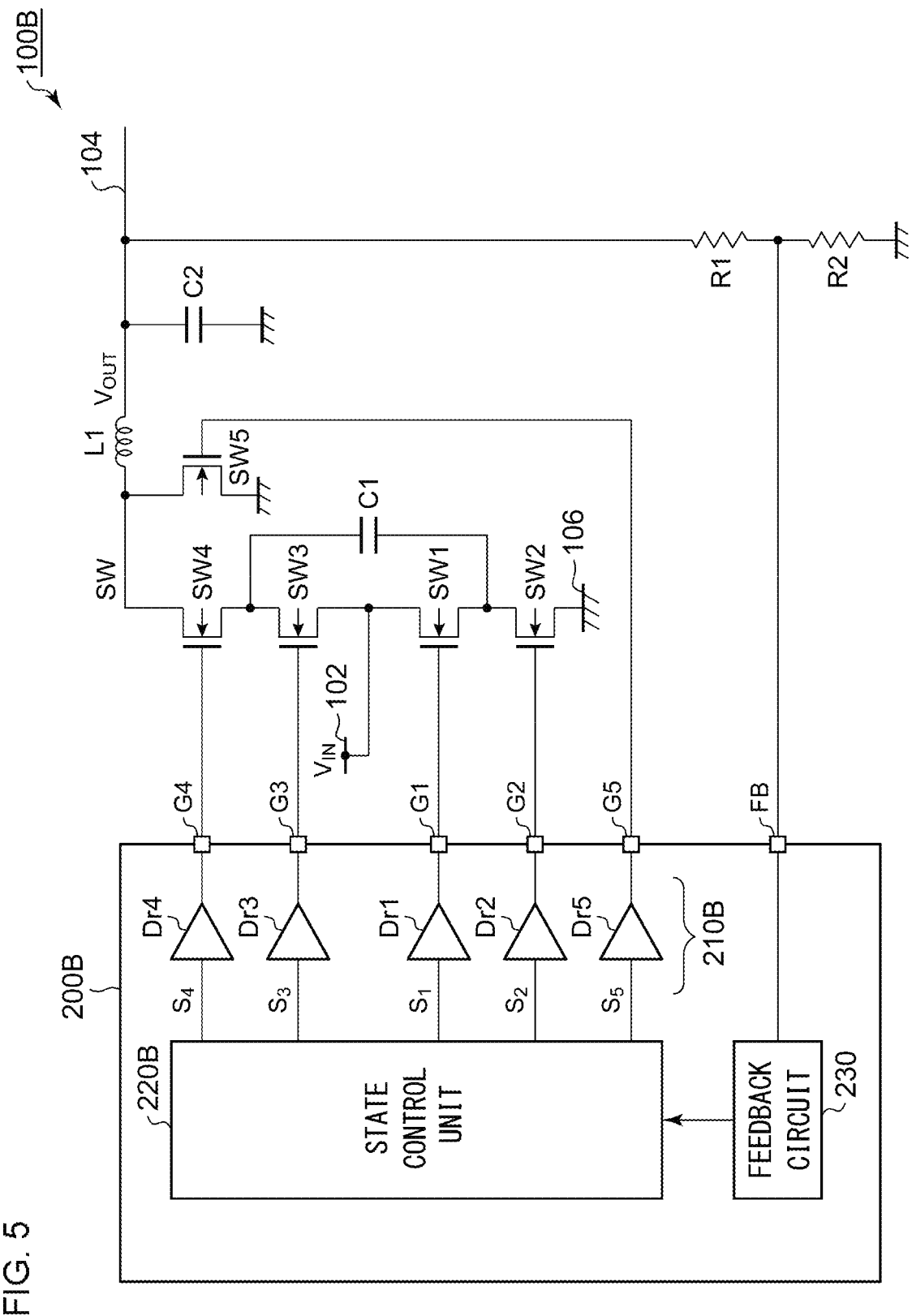
FIG. 5 is a circuit diagram of a switching converter according to Embodiment 1.2.

FIG. 5 is a circuit diagram of a switching converter 100B according to Embodiment 1.2. The switching converter 100B steps up or steps down the input voltage $V_{IN}$ of the input line 102, and generates the stepped-up or stepped-down output voltage $V_{OUT}$ in the output line 104. The switching converter 100B includes a flying capacitor C1, an output capacitor C2, an inductor L1, first to fifth switches SW1 to SW5, resistors R1 and R2, and a controller integrated circuit (IC) 200B.

The inductor L1 is connected between the switching node SW and the output line 104. The output capacitor C2 is connected to the output line 104.

The switching circuit 110B includes a first switch SW1 to a fifth switch SW5 and a flying capacitor C1. The switching circuit 110B has a configuration in which a fourth switch SW4 and a fifth switch SW5 are added to the switching circuit 110A of FIG. 1. The first switch SW1 and the second switch SW2 are connected in series between the input line 102 and the ground line 106. The third switch SW3 and the fourth switch SW4 are connected between the input line 102 and the switching node SW. The fifth switch SW5 is connected between the switching node SW and the ground line 106. The flying capacitor C1 is connected across the third switch SW3 and the first switch SW1. In the present embodiment, the first switch SW1 to the fifth switch SW5 are N-channel MOSFETs.

The controller IC 200B drives the first switch SW1 to the fifth switch SW5, and generates a switching voltage $V_{SW}$ having two voltage levels 0 V and $2\times V_{IN}$ in the switching node SW.

For example, the controller IC 200B alternately repeats the first state φ1 and the second state φ2.
First state φ1
First switch SW1, fourth switch SW4: OFF
Second switch SW2, third switch SW3, fifth switch SW5: ON
Second state φ2
First switch SW1 and fourth switch SW4: ON
Second switch SW2, third switch SW3, fifth switch SW5: OFF The controller IC 200B includes a drive circuit 210B, a state control unit 220B, and a feedback circuit 230, and is a functional IC integrated on one semiconductor substrate. The gate pins G1 to G5 of the controller IC 200B are connected to the gates of the first switch SW1 to the fifth switch SW5. A feedback signal $V_{FB}$ corresponding to the output voltage $V_{OUT}$ of the switching converter 100B is fed back to the feedback pin FB of the controller IC 200B. The resistors R1 and R2 divide the output voltage $V_{OUT}$ to generate a feedback signal $V_{FB}$.

The resistors R1 and R2 may be integrated in the controller IC 200B. In addition, the plurality of switches SW1 to SW5 may be integrated in the controller IC 200B.

The state control unit 220B generates control signals $S_1$ to $S_5$ that define on and off of the first switch SW1 to the fifth switch SW5 and controls the state of the switching converter 100B.

The drive circuit 210B drives the first switch SW1 to the fifth switch SW5 according to the outputs $S_1$ to $S_5$ of the state control unit 220B. The drive circuit 210B includes three drivers Dr1 to Dr5.

The feedback circuit 230 controls a time ratio between the first state φ1 and the second state φ2 such that an error between the feedback signal $V_{FB}$ and the reference voltage $V_{REF}$ approaches 0. The feedback circuit 230 can be configured similarly to a general DC/DC converter.

The switching converter 100B is configured as described above. Next, the operation will be described.

Figure 6:
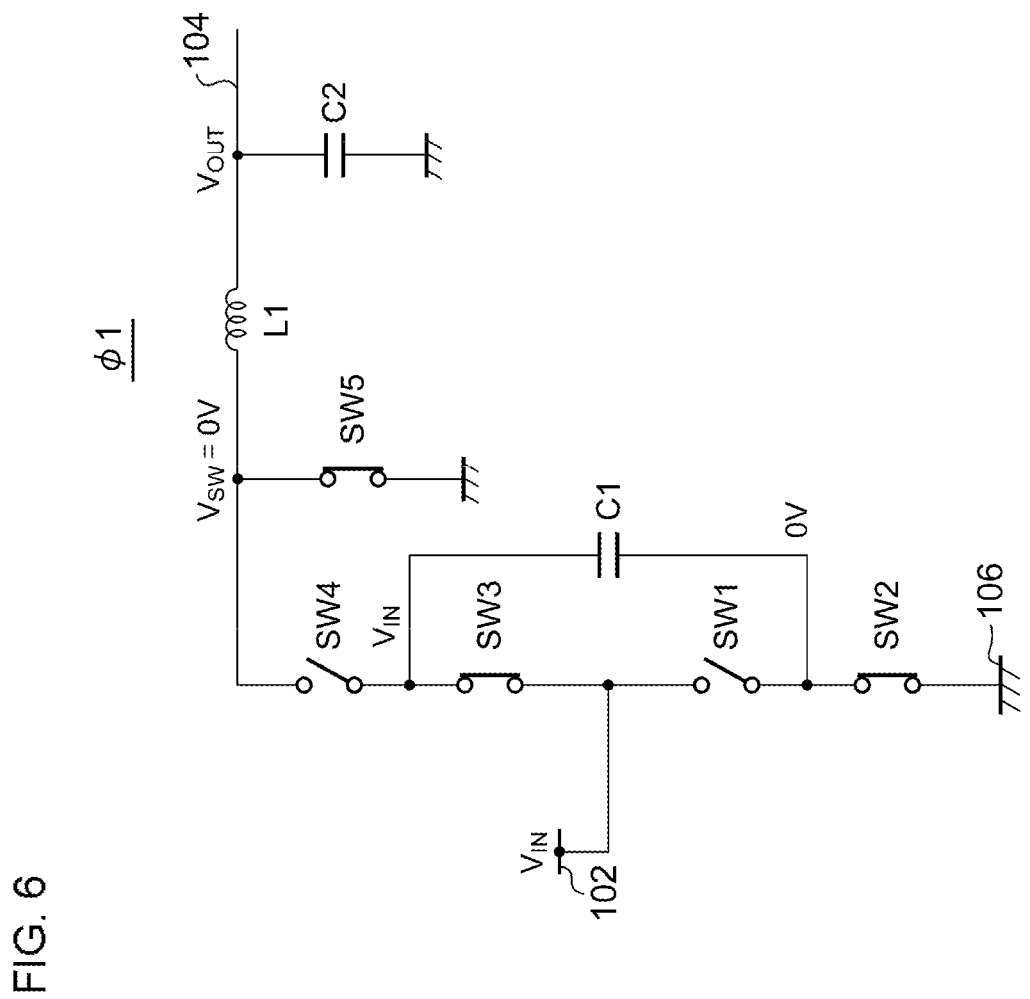
FIG. 6 is an equivalent circuit diagram in a first state of the switching converter of FIG. 5.

FIG. 6 is an equivalent circuit diagram of the first state φ1 of the switching converter 100B of FIG. 5. In the first state φ1, the second switch SW2, the third switch SW3, and the fifth switch SW5 are turned on, and the first switch SW1 and the fourth switch SW4 are turned off. In the first state φ1, $V_{SW}=0$ V, and the flying capacitor C1 is charged with the input voltage $V_{IN}$. That is, the voltage Vc across the flying capacitor C1 is equal to the input voltage $V_{IN}$.

The voltage $\Delta V_{L1}$ across the inductor L1 in the first state φ1 becomes $\Delta V_{L1}=-V_{OUT}$ and becomes a negative voltage. Therefore, the current $I_L$ of the inductor L1 decreases with time with the slope of $(-V_{OUT})/L$.

Figure 7:
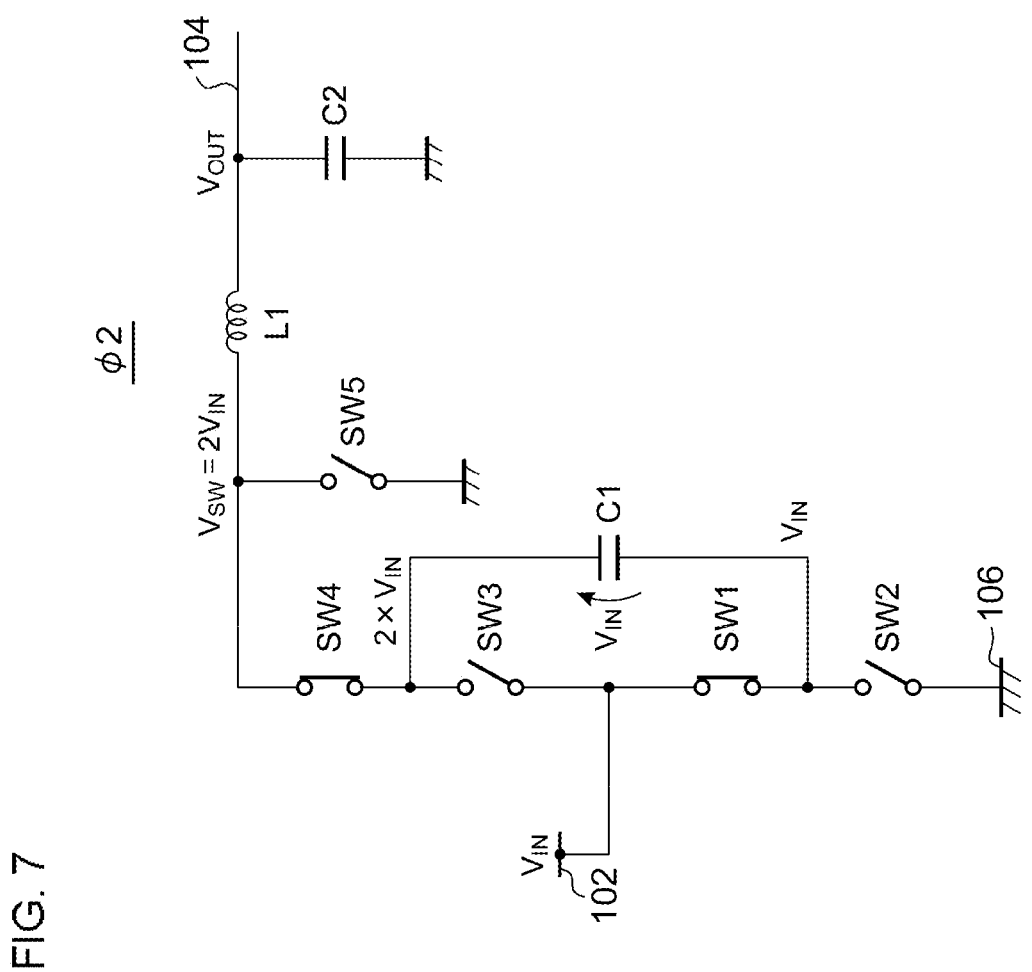
FIG. 7 is an equivalent circuit diagram in a second state of the switching converter of FIG. 5.

FIG. 7 is an equivalent circuit diagram of the second state φ2 of the switching converter 100B of FIG. 5. In the second state φ2, the second switch SW2, the third switch SW3, and the fifth switch SW5 are turned off, and the first switch SW1 and the fourth switch SW4 are turned on. In the second state φ2, $V_{SW}=2\times V_{IN}$.

A voltage $\Delta V_{L2}$ across the inductor L1 in the second state φ2 becomes $\Delta V_{L2}=2\times V_{IN}-V_{OUT}$ and becomes a positive voltage. Therefore, the current $I_L$ of the inductor L1 increases with time with the slope of $(2\times V_{IN}-V_{OUT})/L$.

Figure 8:
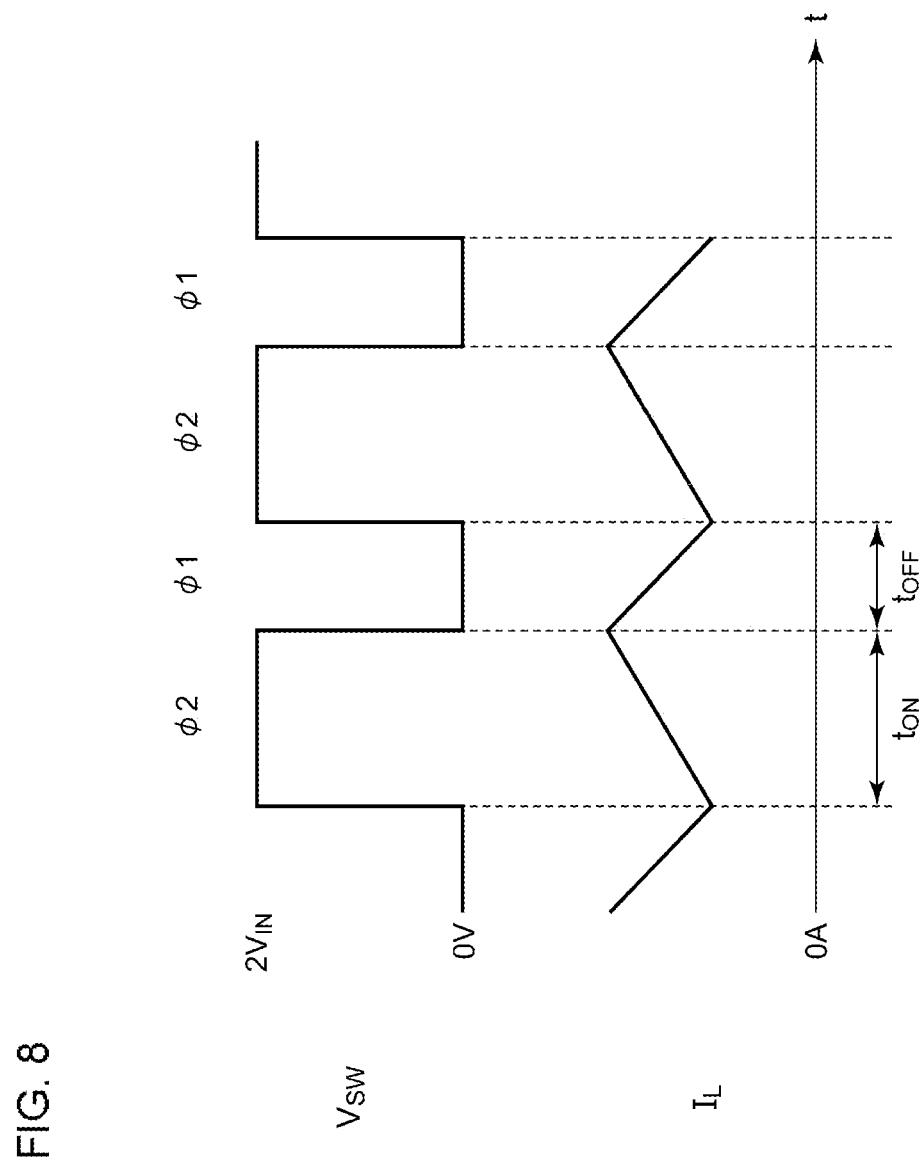
FIG. 8 is an operation waveform diagram of the switching converter of FIG. 5.

FIG. 8 is an operation waveform diagram of the switching converter 100B of FIG. 5. FIG. 8 illustrates the coil current $I_L$ flowing through the inductor L1. In the second state φ2, the coil current $I_L$ increases. When the time of the second state φ2 is $t_{ON}$, the increase amount $\Delta I_{ON}$ of the coil current $I_L$ is calculated as $$\Delta I_{ON}=(2\times V_{IN}-V_{OUT})/L\times t_{ON}.$$

In the first state φ1, the coil current $I_L$ decreases. When the time of the first state φ1 is $t_{OFF}$, the decrease amount $\Delta I_{OFF}$ (absolute value) of the coil current $I_L$ is expressed as $$\Delta I_{OFF} = |V_{OUT}|/L \times t_{OFF} = V_{OUT}/L \times t_{OFF}.$$

In a steady state, when the average value of the coil current $I_L$ is constant, $\Delta I_{ON}=\Delta I_{OFF}$ is established. Therefore, Equation (3) is obtained.

$$(2\times V_{IN}-V_{OUT})/L\times t_{ON}=V_{OUT}/L\times t_{OFF} \qquad (3)$$

When the duty cycle d is defined as $d=t_{ON}/(t_{ON}+t_{OFF})$, Equation (4) is obtained.

$$V_{OUT}=2d\cdot V_{IN}$$

That is, by changing the duty cycle d in the range of 0 to 1, the output voltage $V_{OUT}$ can be changed between 0 to $2\times V_{IN}$, and the step-up/down operation can be realized.

The switching converter 100B operates as described above. Next, advantages thereof will be described.

FIG. 5 will be referenced. Comparing the switching converter 100B with a general step-down converter (buck converter), in the general step-down converter, the switching voltage $V_{SW}$ at one end of the inductor L1 switches between 0 V and $2\times V_{IN}$, whereas in the switching converter 100B of FIG. 5, the switching voltage $V_{SW}$ switches between 0 V and $2\times V_{IN}$. In the switching converter 100B, it can be understood that the high-side transistor (switching transistor) and the low-side transistor (synchronous rectification transistor) of the step-down converter are replaced with the switching circuit 110B. That is, the switching converter 100B can perform the step-up/down operation, but the circuit topology is similar to that of the step-down converter, and thus does not have the RHPZ. This facilitates phase compensation in designing the controller IC 200B. That is, the feedback circuit 230 in FIG. 5 can be configured similarly to the feedback circuit of the step-down converter.

In addition, in a normal step-up/down converter (buck-boost converter), the efficiency is improved when the step-up ratio is closer to 1, but in the switching converter 100B, the efficiency is improved when the step-up ratio is closer to 2 times. Therefore, in the case of operating at a step-up ratio close to 2, the efficiency can also be improved as compared with the conventional step-up/down converter.

Modification

Modifications related to Embodiment 1.1 or Embodiment 1.2 will be described.

In Embodiment 1.1, the controller IC 200A alternately switches the switching circuit 110A between the first state φ1 and the second state φ2, but the present disclosure is not limited thereto. For example, in the light load state, three states of the third state φ3 may be switched in addition to the first state φ1 and the second state φ2. In the third state φ3, all the switches SW1 to SW3 are turned off.

In Embodiment 1.2, the controller IC 200B alternately switches the switching circuit 110B between the first state φ1 and the second state φ2, but the present disclosure is not limited thereto. For example, in the light load state, three states of the third state φ3 may be switched in addition to the first state φ1 and the second state φ2. In the third state φ3, all the switches SW1 to SW5 are turned off.

In Embodiment 1.1 or Embodiment 1.2, the plurality of switches SW1 to SW5 are configured by transistors, but some switches may be diodes.

Application

Figure 9:
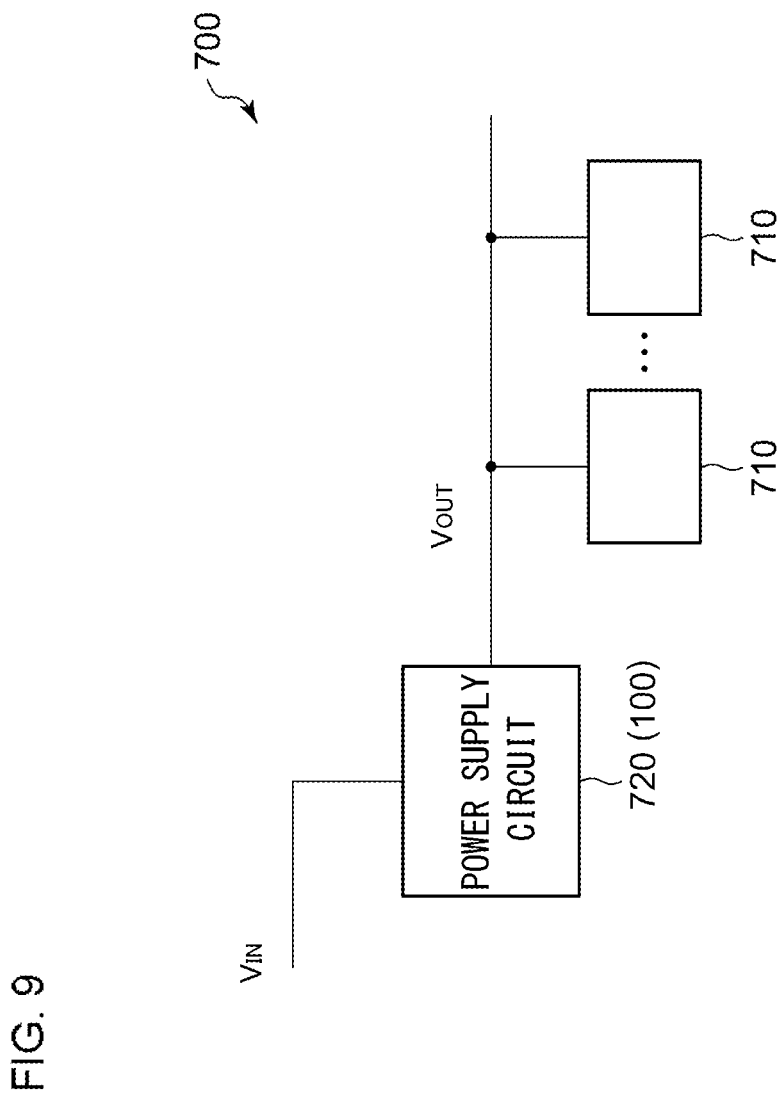
FIG. 9 is a view illustrating an example of an electronic device including a switching converter.

FIG. 9 is a diagram illustrating an example of an electronic device 700 including the switching converter 100. The electronic device 700 includes an internal circuit 710 and a power supply circuit 720. The internal circuit 710 may include a central processing unit (CPU), a memory, an interface circuit of a local area network (LAN), and the like. The power supply circuit 720 steps up (or steps down) the input voltage $V_{IN}$ and supplies the input voltage $V_{IN}$ to the internal circuit 710. The above-described step-up/down converter 100 can be used as the power supply circuit 720.

The electronic device 700 is not limited to the server and may be an in-vehicle device. In addition, the electronic device 700 may be an industrial device, an office automation (OA) device, or a consumer device such as an audio device.

Embodiment 2

Figure 10:
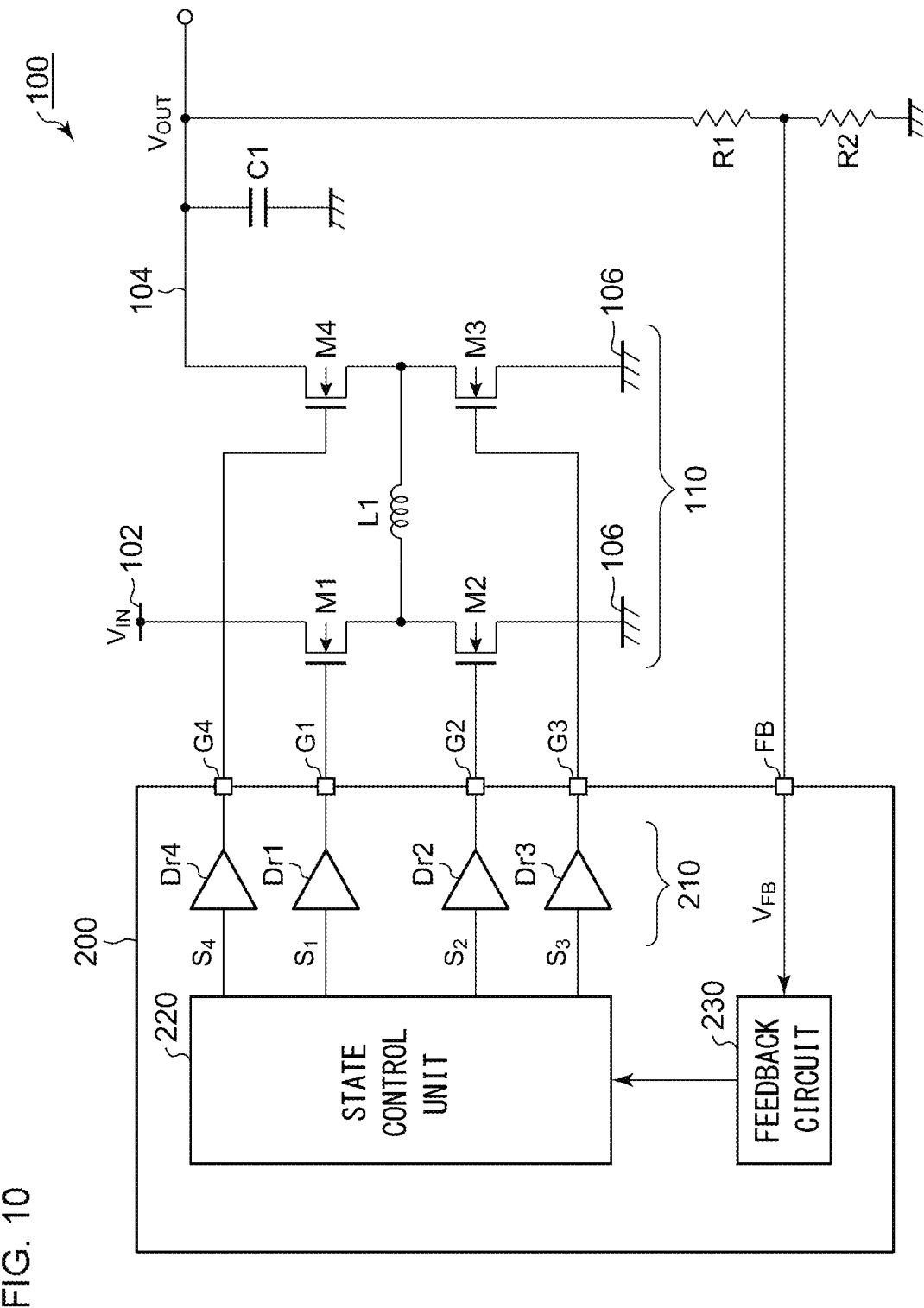
FIG. 10 is a circuit diagram of a step-up/down converter according to Embodiment 2.

FIG. 10 is a circuit diagram of a step-up/down converter 100 according to Embodiment 2. The step-up/down converter 100 steps up or down the input voltage $V_{IN}$ of the input line 102 and generates the stepped-up or stepped-down output voltage $V_{OUT}$ in the output line 104. The step-up/down converter 100 includes an H bridge circuit 110 including a first transistor M1 to a fourth transistor M4, an inductor L1 connected to the H bridge circuit 110, an output capacitor C1 connected to an output line 104, resistors R1 and R2, and a controller integrated circuit (IC) 200.

The first transistor M1 is connected between the input line 102 and the first end of the inductor L1. The second transistor M2 is connected between the first end of the inductor L1 and the ground line 106. The third transistor M3 is connected between the second end of the inductor L1 and the ground line 106. The fourth transistor M4 is connected between the second end of the inductor L1 and the output line 104.

In FIG. 10, the first transistor M1 to the fourth transistor M4 are N-channel MOSFETs (Metal Oxide Semiconductor Field Effect Transistor), but the first transistor M1 and the fourth transistor M4 may be configured by P-channel MOSFETs. The first transistor M1 to the fourth transistor M4 may be IGBTs (Insulated Gate Bipolar Transistors) or bipolar transistors instead of MOSFETs. The first transistor M1 to the fourth transistor M4 may be integrated in the controller IC 200.

The controller IC 200 controls the first transistor M1 to the fourth transistor M4 according to the state of the load and generates the output voltage $V_{OUT}$ in the output line 104. In the present embodiment, the controller IC 200 operates the step-up/down converter 100 as a constant voltage output, and the output voltage $V_{OUT}$ is stabilized at a predetermined target level $V_{OUT(REF)}$.

The controller IC 200 includes a drive circuit 210, a state control unit 220, and a feedback circuit 230, and is a functional IC integrated on one semiconductor substrate. The gate pins G1 to G4 of the controller IC 200 are connected to the gates of the first transistor M1 to the fourth transistor M4.

A feedback signal $V_{FB}$ corresponding to the output voltage $V_{OUT}$ of the step-up/down converter 100 is fed back to the feedback pin FB of the controller IC 200. The resistors R1 and R2 divide the output voltage $V_{OUT}$ to generate a feedback signal $V_{FB}$. The resistors R1 and R2 may be integrated in the controller IC 200.

The state control unit 220 is a control logic, generates control signals $S_1$ to $S_4$ that define on and off of the first transistor M1 to the fourth transistor M4, and controls the state of the step-up/down converter 100.

The state control unit 220 operates in the step-down mode when $V_{IN} > V_{OUT(REF)}$ and in the step-up mode when $V_{IN} < V_{OUT(REF)}$.

The drive circuit 210 drives the first transistor M1 to the fourth transistor M4 according to the outputs $S_1$ to $S_4$ of the state control unit 220. The drive circuit 210 includes four drivers Dr1 to Dr4.

The state control unit 220 repeats the three states φ1 to φ3 in the step-up mode.
(i) First state φ1 (step-up on state)
First transistor M1: ON
Second transistor M2: OFF
Third transistor M3: ON
Fourth transistor M4: OFF
(ii) Second state φ2 (step-up off state)
First transistor M1: ON
Second transistor M2: OFF
Third transistor M3: OFF
Fourth transistor M4: ON
(iii) Third state φ3 (step-up clamping state)
First transistor M1: OFF
Second transistor M2: ON
Third transistor M3: ON
Fourth transistor M4: OFF The state control unit 220 repeats the following three states φ4 to φ6 in the step-down mode.
(iv) Fourth state φ4 (step-down on state)
First transistor M1: ON
Second transistor M2: OFF
Third transistor M3: OFF
Fourth transistor M4: ON
(v) Fifth state φ5 (step-down off state)
First transistor M1: OFF
Second transistor M2: ON
Third transistor M3: OFF
Fourth transistor M4: ON
(iii) Sixth state φ6 (step-down clamping state)
First transistor M1: OFF
Second transistor M2: ON
Third transistor M3: ON
Fourth transistor M4: OFF That is, the fourth state φ4 in the step-down mode is the same state as the second state φ2 in the step-up mode, and the sixth state φ6 in the step-down mode is the same state as the third state φ3 in the step-up mode.

The feedback circuit 230 controls the operation mode of the state control unit 220 and the time of each of the first state φ1 to the third state φ3 or the time of each of the fourth state φ4 to the sixth state φ6 so that the error between the feedback signal $V_{FB}$ and the reference voltage $V_{REF}$ approaches 0. When the feedback loop is stabilized, the output voltage $V_{OUT}$ is stabilized to a target level $V_{OUT(REF)}$ according to the reference voltage $V_{REF}$.

$$V_{OUT(REF)} = V_{REF} \times (R1+R2)/R2$$

The feedback circuit 230 can be configured similarly to a general DC/DC converter, and can include, for example, a pulse width modulator or a pulse frequency modulator. In addition, the control method is not particularly limited, and the controller may be a voltage mode controller and a peak current mode or average current mode controller or may be a ripple control controller. Specifically, the controller may use hysteresis control (Bang-Bang control), bottom detection on-time fixed control, or peak detection off-time fixed control.

The step-up/down converter 100 is configured as described above. Next, the operation will be described.

First, the operation in the step-up mode will be described.

Figure 11:
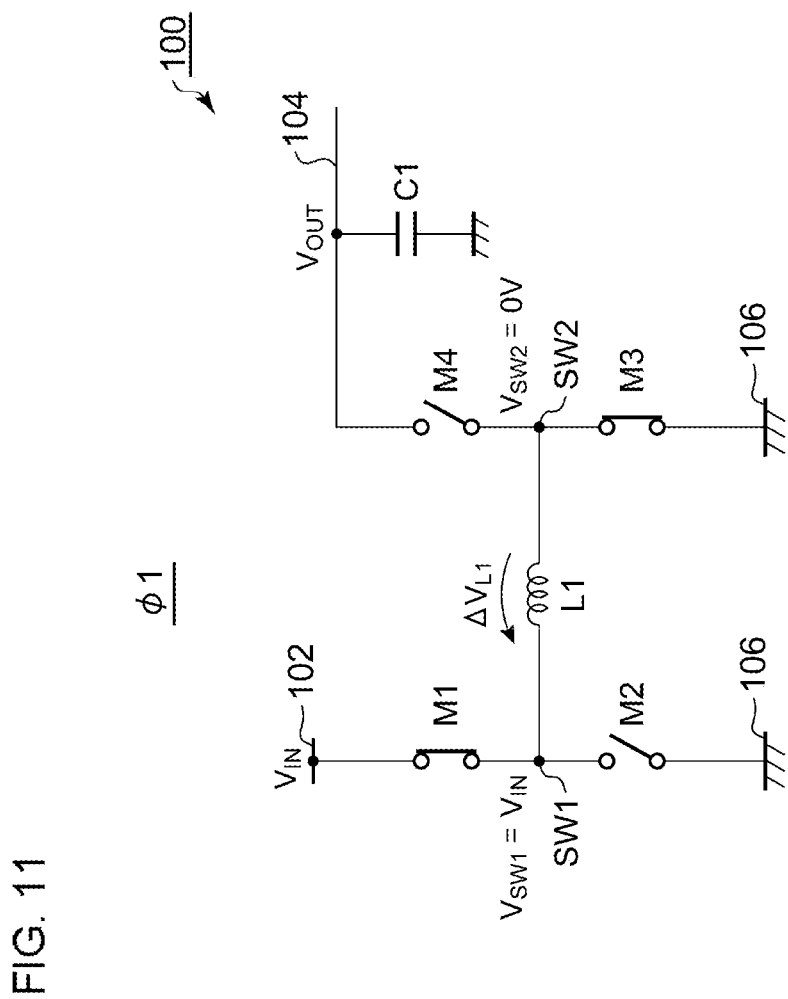
FIG. 11 is an equivalent circuit diagram in a first state of the step-up mode of the step-up/down converter of FIG. 10.

FIG. 11 is an equivalent circuit diagram of the first state φ1 of the step-up mode of the step-up/down converter 100 of FIG. 10. In the first state φ1, the first transistor M1 and the third transistor M3 are turned on, and the second transistor M2 and the fourth transistor M4 are turned off. A first end of the inductor L1 is referred to as a first switching node SW1, a second end of the inductor L1 is referred to as a second switching node SW2, and respective voltages are referred to as a first switching voltage $V_{SW1}$ and a second switching voltage $V_{SW2}$.

In the first state φ1, since $V_{SW1}=V_{IN}$ and $V_{SW2}=0$ V, the voltage $\Delta V_{L1}$ across the inductor L1 is $\Delta V_{L1}=V_{IN}$. Therefore, the current $I_L$ of the inductor L1 increases with time with the slope of $V_{IN}/L$.

Figure 12:
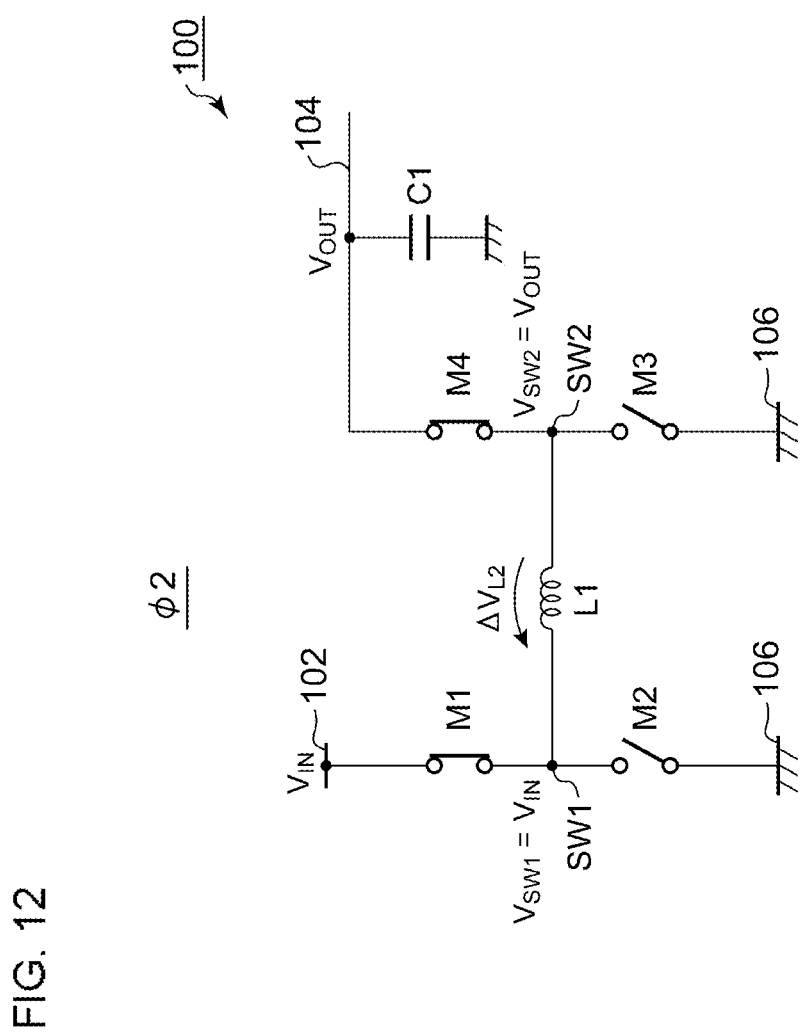
FIG. 12 is an equivalent circuit diagram in a second state of the step-up mode of the step-up/down converter of FIG. 10.

FIG. 12 is an equivalent circuit diagram of the second state φ2 of the step-up mode of the step-up/down converter 100 of FIG. 10. In the second state φ2, the first transistor M1 and the fourth transistor M4 are turned on, and the second transistor M2 and the third transistor M3 are turned off. At this time, since $V_{SW1}=V_{IN}$ and $V_{SW2}=V_{OUT}$, the voltage $\Delta V_{L2}$ across the inductor L1 becomes $\Delta V_{L2}=V_{IN}-V_{OUT}$. In the step-up mode, since $V_{IN}<V_{OUT}$, $V_{IN}-V_{OUT}$ is a negative voltage, and the current $I_L$ of the inductor L1 decreases with time with the slope of $(V_{IN}-V_{OUT})/L$.

Figure 13:
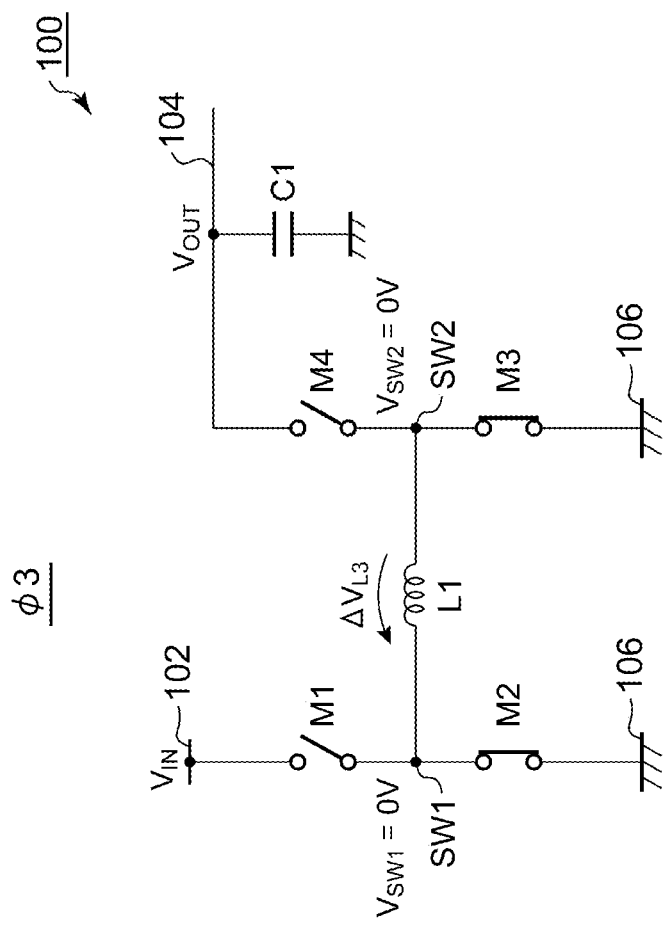
FIG. 13 is an equivalent circuit diagram in a third state of the step-up mode of the step-up/down converter of FIG. 10.

FIG. 13 is an equivalent circuit diagram of the third state φ3 of the step-up mode of the step-up/down converter 100 of FIG. 10. In the third state φ3, the second transistor M2 and the third transistor M3 are turned on, and the first transistor M1 and the fourth transistor M4 are turned off. At this time, since $V_{SW1}=V_{SW2}=0$ V, the voltage $\Delta V_{L3}$ across the inductor L1 becomes 0 V. Therefore, the current $I_L$ of the inductor L1 is constant.

Figure 14:
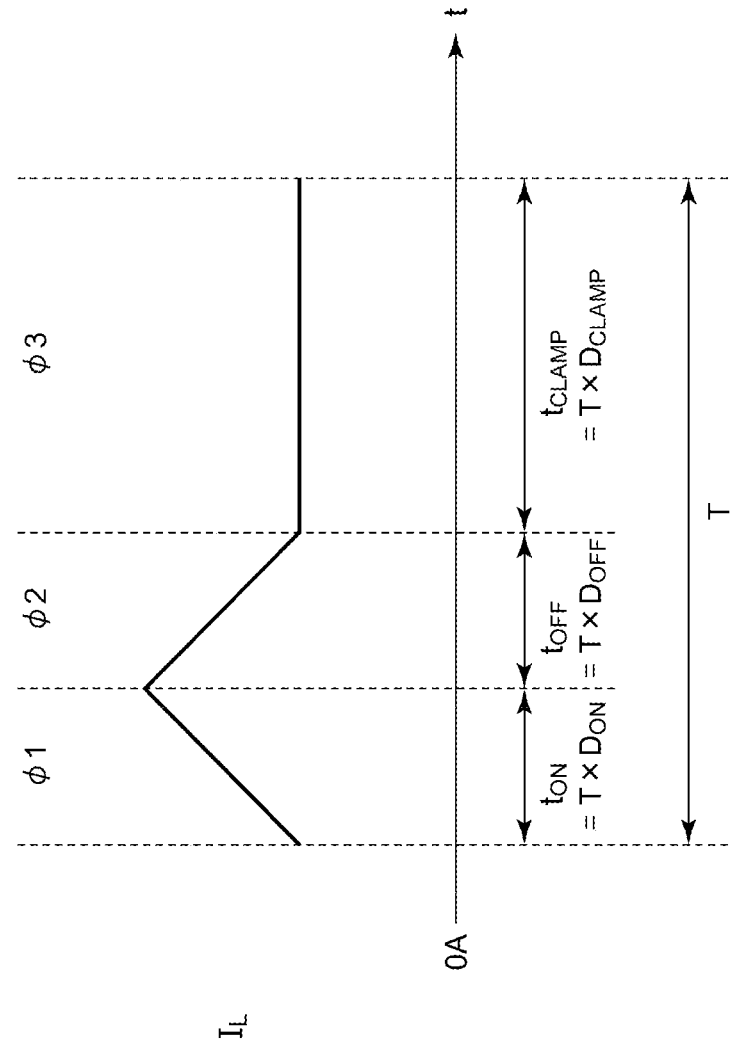
FIG. 14 is an operation waveform diagram of the step-up mode of the step-up/down converter of FIG. 10.

FIG. 14 is an operation waveform diagram of the step-up mode of the step-up/down converter 100 of FIG. 10. FIG. 14 illustrates the coil current $I_L$ flowing through the inductor L1. The times of the first state φ1 to the third state φ3 are $t_{ON}$, $t_{OFF}$, and $t_{CLAMP}$, respectively. The switching cycle is T, and $t_{ON}=D_{ON}\times T$, $t_{OFF}=D_{OFF}\times T$, and $t_{CLAMP}=D_{CLAMP}\times T$. However, $D_{ON}+D_{OFF}+D_{CLAMP}=1$.

In the step-up mode, by repeating the first state φ1 to the third state φ3, the coil current $I_L$ has a waveform similar to that in a discontinuous conduction mode (DCM) of a general step-down converter (buck converter). The difference from DCM is that, in DCM, there is a section of $I_L=0$ A, whereas in the third state φ3, the coil current $I_L$ is kept constant in a state of $I_L>0$ A.

In each of the first state φ1 to the third state φ3, Equations (1) to (3) are established.

$$\begin{pmatrix} \frac{di_L}{dt} \\ \frac{dv_{OUT}}{dt} \end{pmatrix} = \begin{pmatrix} 0 & 0 \\ 0 & -\frac{1}{RC} \end{pmatrix} \begin{pmatrix} i_L \\ v_{OUT} \end{pmatrix} \quad (1)$$

$$\begin{pmatrix} \frac{di_L}{dt} \\ \frac{dv_{OUT}}{dt} \end{pmatrix} = \begin{pmatrix} 0 & 0 \\ 0 & -\frac{1}{RC} \end{pmatrix} \begin{pmatrix} i_L \\ v_{OUT} \end{pmatrix} + \begin{pmatrix} \frac{1}{L} \\ 0 \end{pmatrix} V_{IN} \quad (2)$$

$$\begin{pmatrix} \frac{di_L}{dt} \\ \frac{dv_{OUT}}{dt} \end{pmatrix} = \begin{pmatrix} 0 & \frac{1}{L} \\ \frac{1}{C} & -\frac{1}{RC} \end{pmatrix} \begin{pmatrix} i_L \\ v_{OUT} \end{pmatrix} + \begin{pmatrix} \frac{1}{L} \\ 0 \end{pmatrix} V_{IN} \quad (3)$$

In the steady state, the average value of the coil current $I_L$ and the output voltage $V_{OUT}$ is constant over time. That is, Equation (4) holds for the coil current $I_L$.

$$\Delta I_{L1}+\Delta I_{L2}+\Delta I_{L3}=0 \quad (4)$$

Equation (5) holds for the output voltage $V_{OUT}$.

$$\Delta V_{OUT1}+\Delta V_{OUT2}+\Delta V_{OUT3}=0 \quad (5)$$

$$\Delta V_{OUT1}=t_{ON}\times dV_{OUT}/dt$$

$$\Delta V_{OUT2}=t_{OFF}\times dV_{OUT}/dt$$

$$\Delta V_{OUT3}=t_{CLAMP}\times dV_{OUT}/dt$$

When a transfer function having $D_{IN}$ as an input and $V_{OUT}$ as an output is obtained with $D_{OFF}$ as a constant, Equation (6) is obtained.

$$\frac{v_{OUT}(S)}{D_{on}(S)} = \frac{V_{IN}}{D_{off}} \frac{1}{s^2 \frac{LC}{D_{off}^2} + s \frac{L}{RD_{off}^2} + 1} \quad (6)$$

Equation (6) does not include the term of $(1-j\omega/\omega_{RH})$, that is, RHPZ.

As described above, according to the present embodiment, it is possible to provide a step-up/down converter that does not include RHPZ. In addition, by forming a feedback loop in which at least one of $D_{ON}$, $D_{OFF}$, and $D_{CLAMP}$ is set as a control target, an error between the feedback signal $V_{FB}$ and the reference voltage $V_{REF}$ can be brought close to zero, and the output voltage $V_{OUT}$ can be stabilized at the target level $V_{OUT(REF)}$.

Next, the operation of the step-down mode of the step-up/down converter 100 will be described.

Figure 15:
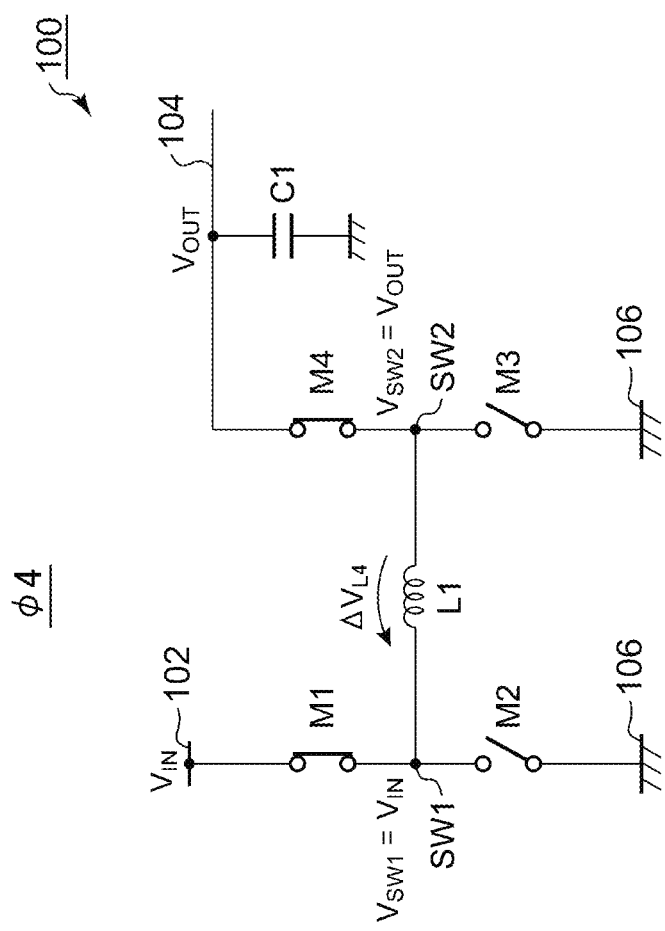
FIG. 15 is an equivalent circuit diagram in a fourth state of the step-down mode of the step-up/down converter of FIG. 10.

FIG. 15 is an equivalent circuit diagram of the fourth state φ4 of the step-down mode of the step-up/down converter 100 of FIG. 10. In the fourth state φ4, the first transistor M1 and the fourth transistor M4 are turned on, and the second transistor M2 and the third transistor M3 are turned off. At this time, since $V_{SW1}=V_{IN}$ and $V_{SW2}=V_{OUT}$, the voltage $\Delta V_{L4}$ across the inductor L1 becomes $\Delta V_{L4}=V_{IN}-V_{OUT}$. In the step-down mode, since $V_{IN}>V_{OUT}$, the current $I_L$ of the inductor L1 thus increases with time with the slope of $(V_{IN}-V_{OUT})/L$.

Figure 16:
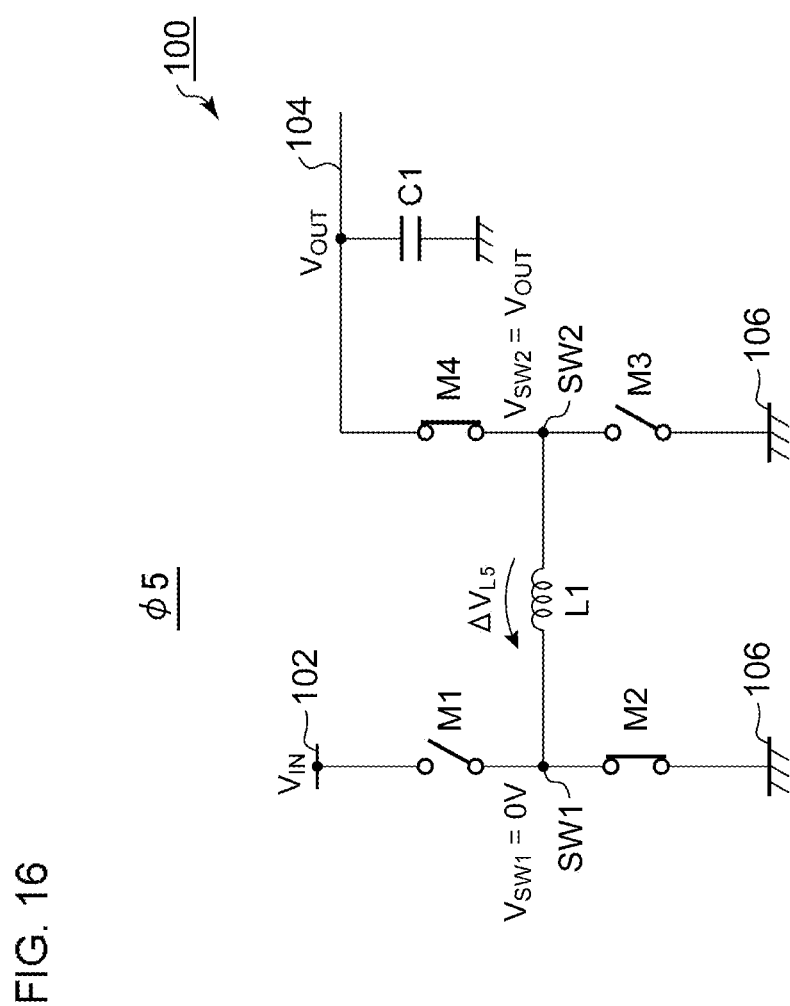
FIG. 16 is an equivalent circuit diagram in a fifth state of the step-down mode of the step-up/down converter of FIG. 10.

FIG. 16 is an equivalent circuit diagram of the step-down mode fifth state φ5 of the step-up/down converter 100 of FIG. 10. In the fifth state φ5, the second transistor M2 and the fourth transistor M4 are turned on, and the first transistor M1 and the third transistor M3 are turned off. At this time, since $V_{SW1}=0$ V and $V_{SW2}=V_{OUT}$, the voltage $\Delta V_{L5}$ across the inductor L1 becomes $\Delta V_{L5}=-V_{OUT}$. The current $I_L$ of the inductor L1 decreases with time with the slope of $-V_{OUT}/L$.

Figure 17:
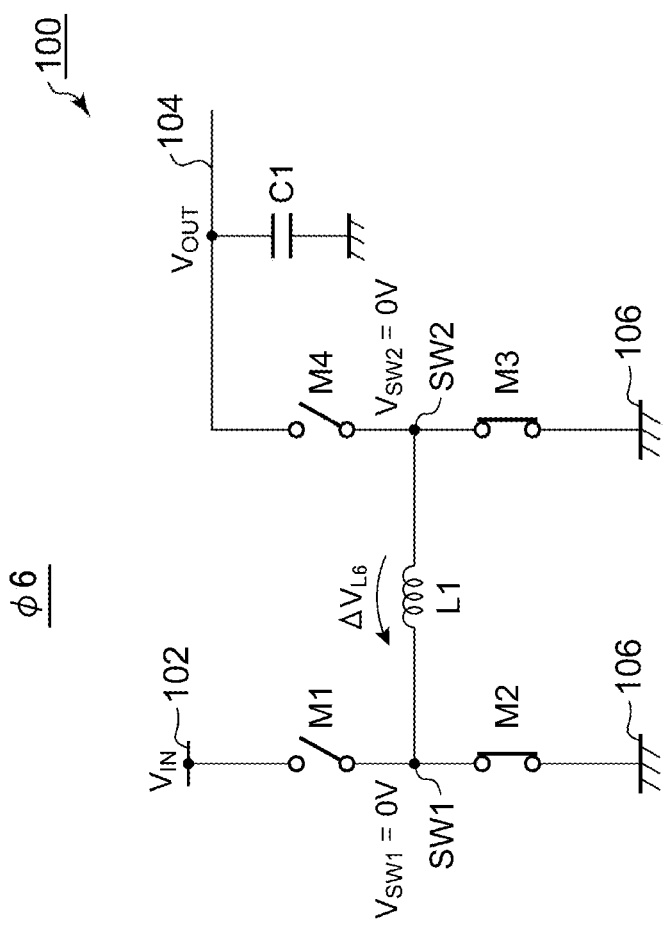
FIG. 17 is an equivalent circuit diagram in a sixth state of the step-down mode of the step-up/down converter of FIG. 10.

FIG. 17 is an equivalent circuit diagram of the step-down mode sixth state φ6 of the step-up/down converter 100 of FIG. 10. In the sixth state φ6, the second transistor M2 and the third transistor M3 are turned on, and the first transistor M1 and the fourth transistor M4 are turned off. At this time, since $V_{SW1}=V_{SW2}=0$ V, the voltage $\Delta V_{L3}$ across the inductor L1 becomes 0 V. Therefore, the current $I_L$ of the inductor L1 is constant.

Figure 18:
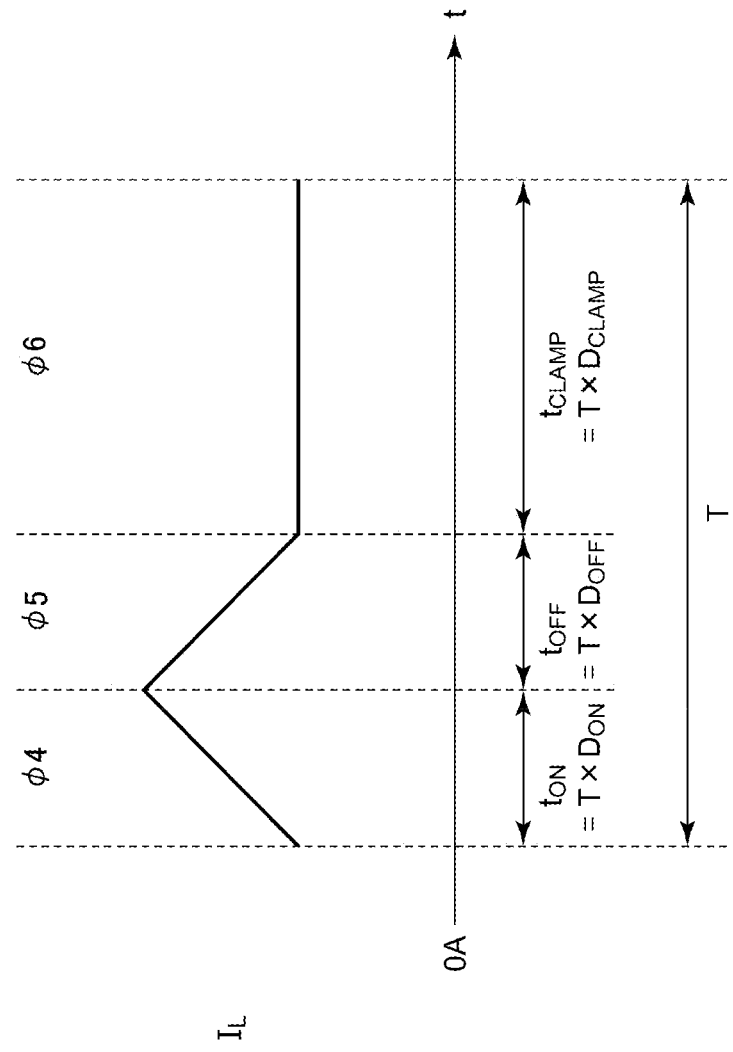
FIG. 18 is an operation waveform diagram of the step-down mode of the step-up/down converter of FIG. 10.

FIG. 18 is an operation waveform diagram in a step-down mode of the step-up/down converter 100 in FIG. 10. FIG. 18 illustrates the coil current $I_L$ flowing through the inductor L1. The times of the fourth state φ4 to the sixth state φ6 are $t_{ON}$, $t_{OFF}$, and $t_{CLAMP}$, respectively.

In the step-down mode, by repeating the fourth state φ4 to the sixth state φ6, the coil current $I_L$ changes like a discontinuous conduction mode (DCM). By controlling the lengths of the fourth state φ4 to the sixth state φ6, the output voltage $V_{OUT}$ can be stabilized at the target level $V_{OUT(REF)}$.

A general step-down converter is controlled in two states of the fourth state φ4 and the fifth state φ5. On the other hand, as in the present embodiment, by performing control in three states in the step-up mode and the step-down mode, the configuration and control of the state control unit 220 and the feedback circuit 230 can be shared between the step-up mode and the step-down mode.

Modification

A modification related to Embodiment 2 will be described.

In Embodiment 2, the controller IC 200 switches the three states of the fourth state φ4 to the sixth state φ6 in the step-down mode, but the present invention is not limited thereto. In the step-down mode, since there is originally no RHPZ, the sixth state φ6 can be omitted, and thus switching may be performed between two states of the fourth state φ4 and the fifth state φ5.

Application

Figure 19:
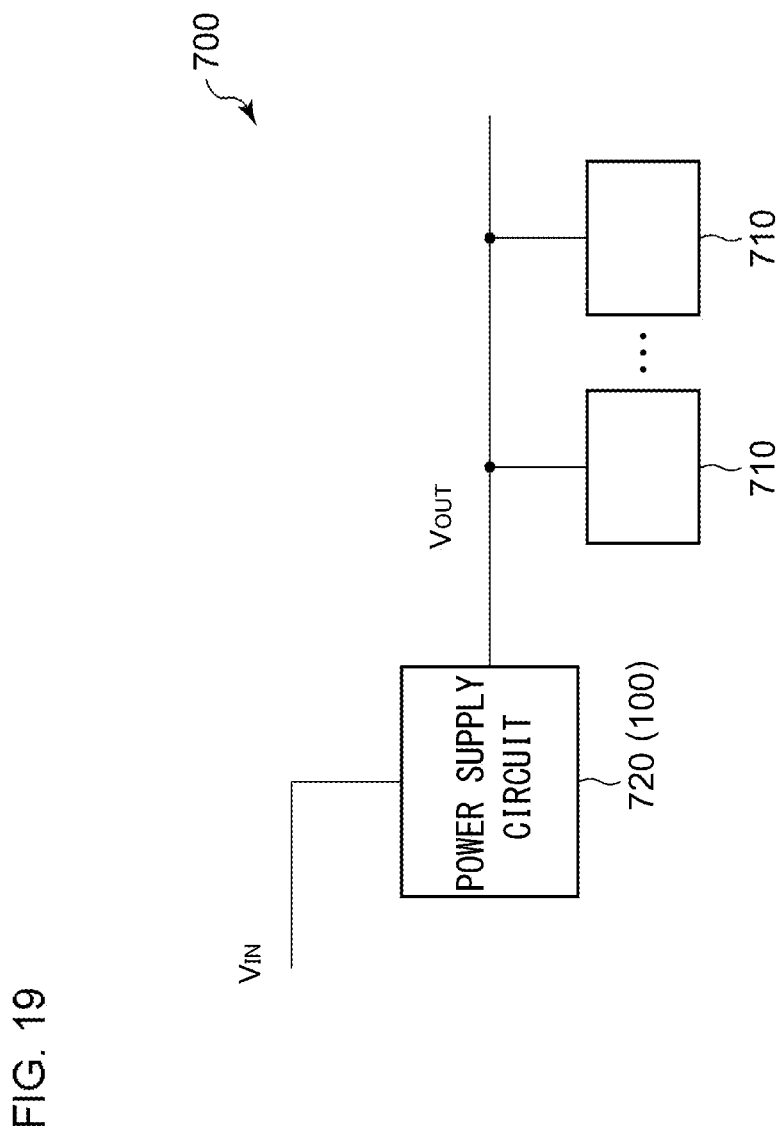
FIG. 19 is a diagram illustrating an example of an electronic device including a step-up/down converter.

FIG. 19 is a diagram illustrating an example of an electronic device 700 including the step-up/down converter 100. The electronic device 700 includes an internal circuit 710 and a power supply circuit 720. The internal circuit 710 may include a central processing unit (CPU), a memory, an interface circuit of a local area network (LAN), and the like. The power supply circuit 720 steps up (or steps down) the input voltage $V_{IN}$ and supplies the input voltage $V_{IN}$ to the internal circuit 710. The above-described step-up/down converter 100 can be used as the power supply circuit 720.

The electronic device 700 is not limited to the server and may be an in-vehicle device. In addition, the electronic device 700 may be an industrial device, an office automation (OA) device, or a consumer device such as an audio device.

Embodiment 3

Figure 20:
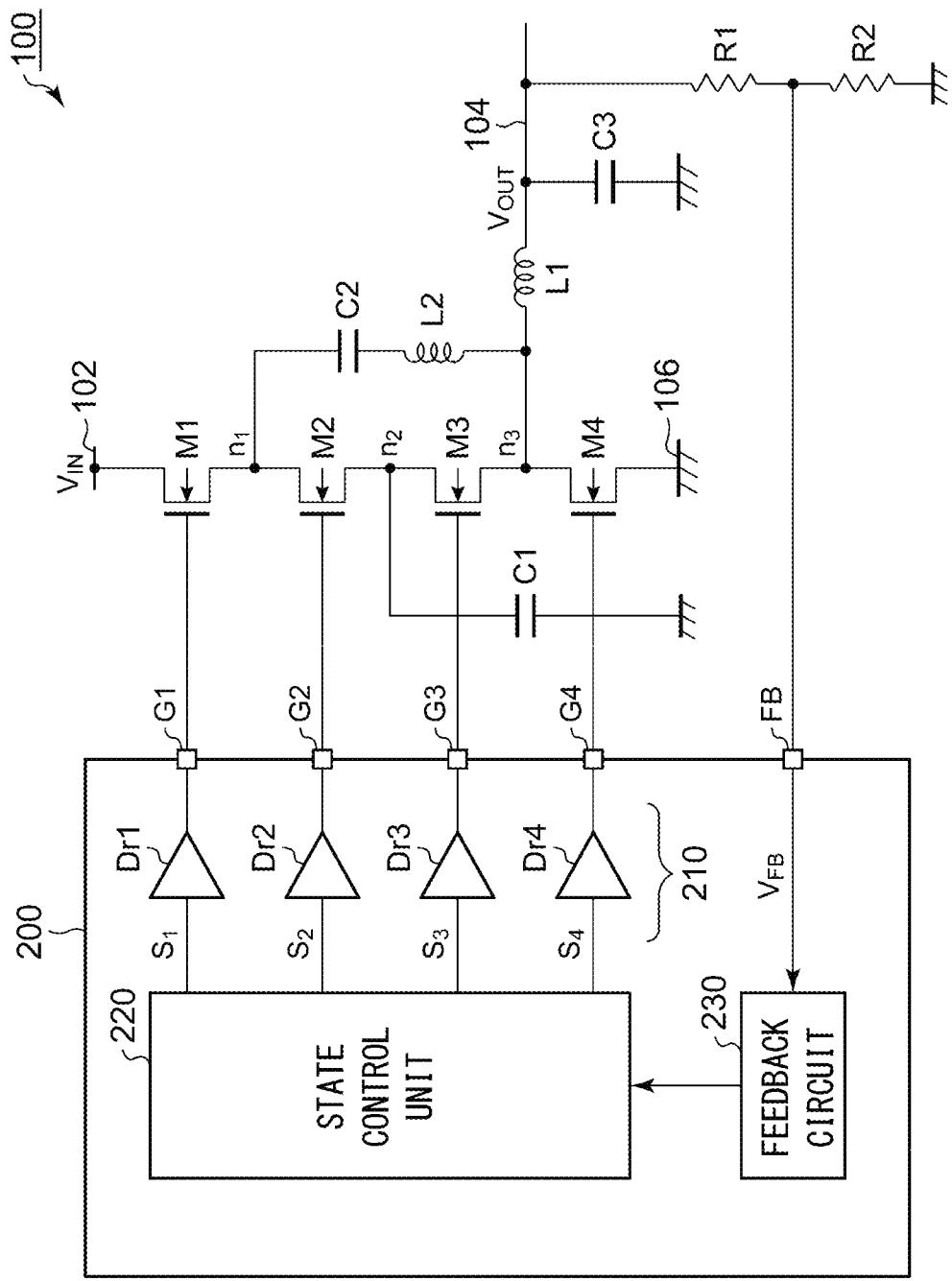
FIG. 20 is a circuit diagram of a switching converter according to Embodiment 3.

FIG. 20 is a circuit diagram of a switching converter 100 according to Embodiment 3. The switching converter 100 steps down the input voltage $V_{IN}$ of the input line 102 and generates the stepped-down output voltage $V_{OUT}$ in the output line 104. The switching converter 100 includes a first transistor M1 to a fourth transistor M4, a first capacitor C1, a second capacitor C2, an output capacitor C3, a first inductor L1, a second inductor L2, and a controller IC 200. The second capacitor C2 is also referred to as a flying capacitor.

The first transistor M1, the second transistor M2, the third transistor M3, and the fourth transistor M4 are connected in series between the input line 102 and the ground line 106. The first transistor M1 to the fourth transistor M4 are N-channel MOSFETs (Metal Oxide Semiconductor Field Effect Transistor).

The first capacitor C1 is connected between the connection node n2 of the second transistor M2 and the third transistor M3 and the ground line 106. The second capacitor C2 is connected between the connection node n1 of the first transistor M1 and the second transistor M2 and the connection node n3 of the third transistor M3 and the fourth transistor M4.

The first inductor L1 is connected between the connection node n3 of the third transistor M3 and the fourth transistor M4 and the output line 104.

The output capacitor C3 is connected to the output line 104.

The second inductor L2 is provided on the loop 110 that returns from the ground line 106 to the ground line 106 via the fourth transistor M4, the second capacitor C2, the second transistor M2, and the first capacitor C1. In the present embodiment, the second inductor L2 is connected in series with the second capacitor C2 across the second transistor M2 and the third transistor M3, that is, between the node n1 and the node n3. The inductance of the second inductor L2 is preferably smaller than the inductance of the first inductor L1.

The controller IC 200 drives the first transistor M1 to the fourth transistor M4. For example, the controller IC 200 alternately repeats the first state φ1 and the second state φ2.

First state φ1
First transistor M1: ON
Second transistor M2: OFF
Third transistor M3: ON
Fourth transistor M4: OFF
Second state φ2
First transistor M1: OFF
Second transistor M2: ON
Third transistor M3: OFF
Fourth transistor M4: ON The controller IC 200 includes a drive circuit 210, a state control unit 220, and a feedback circuit 230, and is a functional IC integrated on one semiconductor substrate. The gate pins G1 to G4 of the controller IC 200 are connected to the gates of the first transistor M1 to the fourth transistor M4. A feedback signal $V_{FB}$ corresponding to the output voltage $V_{OUT}$ of the switching converter 100 is fed back to the feedback pin FB of the controller IC 200. The resistors R1 and R2 divide the output voltage $V_{OUT}$ to generate a feedback signal $V_{FB}$.

The resistors R1 and R2 may be integrated in the controller IC 200. The first transistor M1 to the fourth transistor M4 may be integrated in the controller IC 200.

The state control unit 220 is a control logic, generates control signals $S_1$ to $S_4$ that define on and off of the first transistor M1 to the fourth transistor M4, and controls the state of the switching converter 100.

The drive circuit 210 drives the first transistor M1 to the fourth transistor M4 according to the outputs $S_1$ to $S_4$ of the state control unit 220. The drive circuit 210 includes four drivers Dr1 to Dr4.

The feedback circuit 230 controls a time ratio between the first state φ1 and the second state φ2 such that an error between the feedback signal $V_{FB}$ and the reference voltage $V_{REF}$ approaches 0. The feedback circuit 230 can be configured similarly to a general DC/DC converter, and can include, for example, a pulse width modulator or a pulse frequency modulator. In addition, the control method is not particularly limited, and the controller may be a voltage mode controller and a peak current mode or average current mode controller or may be a ripple control controller. Specifically, the controller may use hysteresis control (Bang-Bang control), bottom detection on-time fixed control, or peak detection off-time fixed control.

The switching converter 100 is configured as described above. Before describing an operation of the switching converter 100, a switching converter according to a comparative technique will be described.

Figure 21:
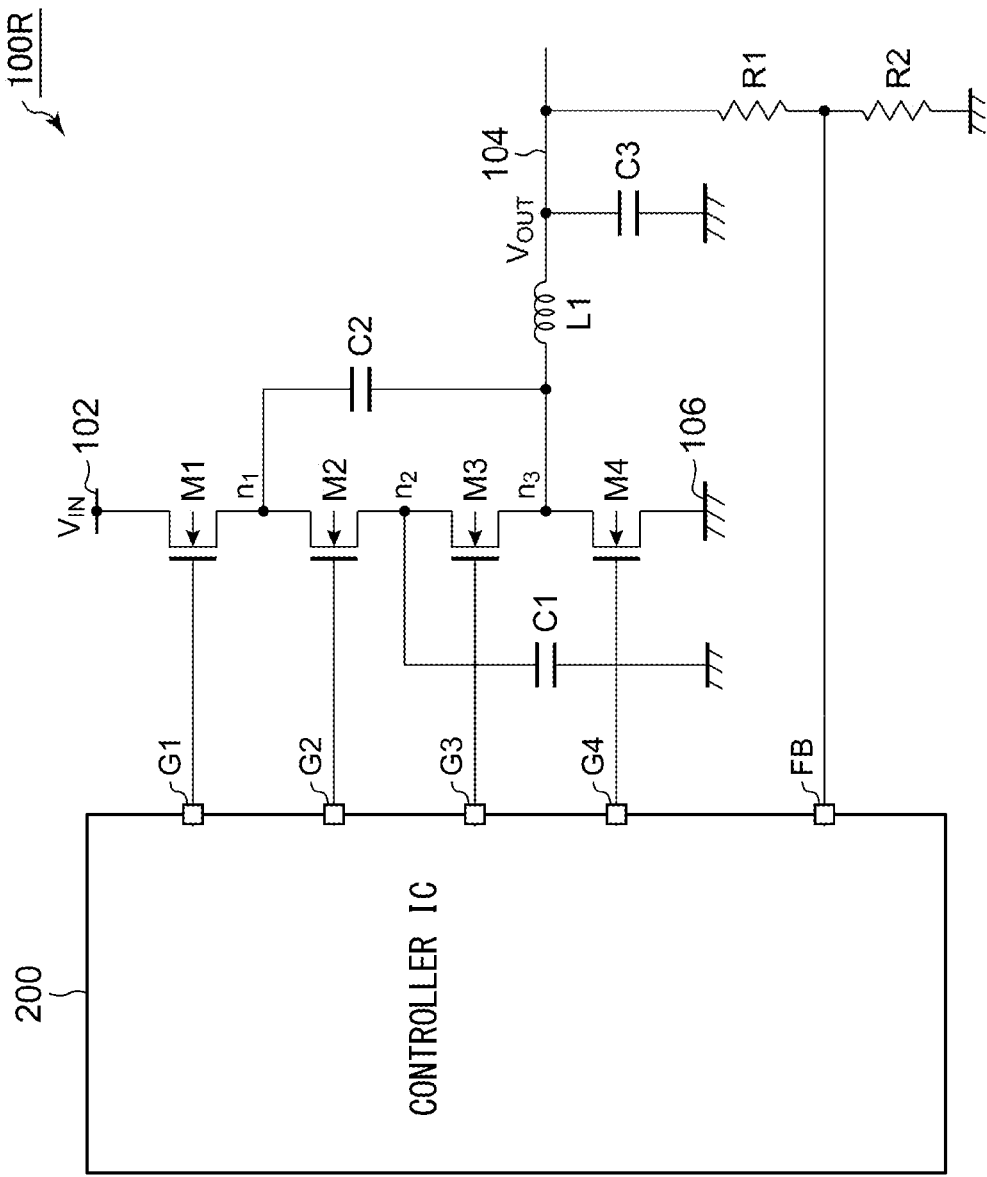
FIG. 21 is a circuit diagram of a switching converter according to a comparative technique.

FIG. 21 is a circuit diagram of a switching converter 100R according to a comparative technique. The switching converter 100R has a configuration in which the second inductor L2 is omitted from the switching converter 100 of FIG. 20.

The switching converter 100R according to the comparative technique is also referred to as a hybrid DC/DC converter.

The switching converter 100R repeats the first state $\varphi_I$ in which the transistors M1 and M3 are turned on and the transistors M2 and M4 are turned off, and the second state $\varphi_{II}$ in which the transistors M1 and M3 are turned off and the transistors M2 and M4 are turned on.

Figure 22:
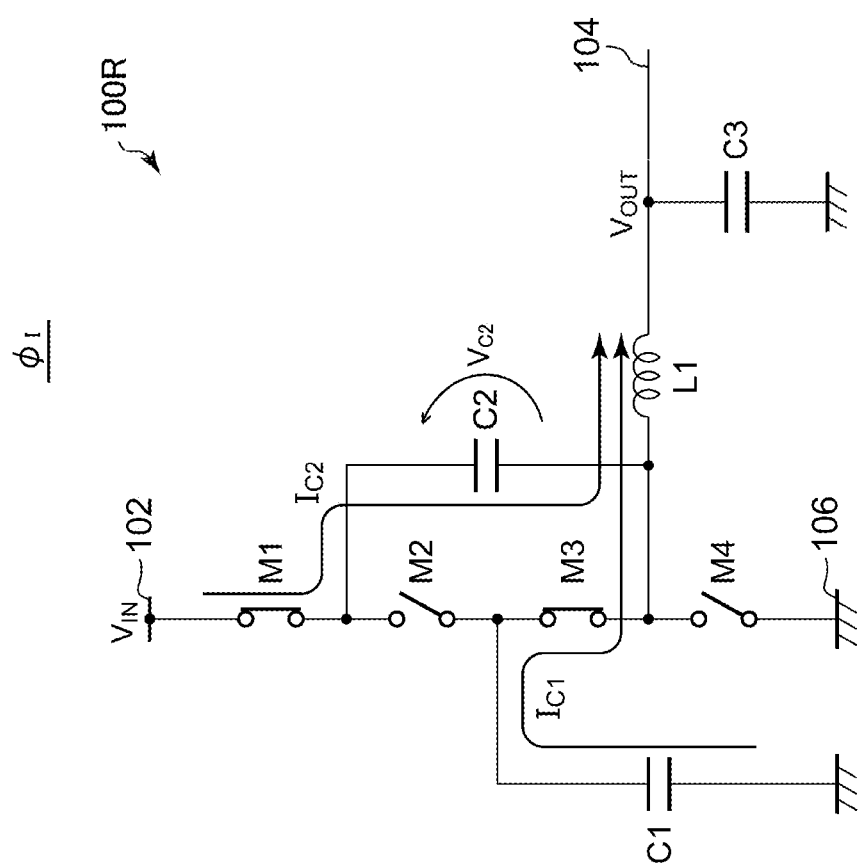
FIG. 22 is an equivalent circuit diagram in the first state $\varphi_1$ of a switching converter according to a comparative technique.

FIG. 22 is an equivalent circuit diagram of the first state $\varphi_I$ of the switching converter 100R according to the comparative technique. In the first state $\varphi_I$, the charging current Ice of the second capacitor C2 and the discharging current $I_{C1}$ of the first capacitor C1 flow through the first inductor L1. The charging current $I_{C2}$ of the second capacitor C2 passes through the first transistor M1. On the other hand, the discharging current $I_{C1}$ of the first capacitor C1 passes through the third transistor M3.

Since the second capacitor C2 and the first capacitor C1 are connected in series between the input line 102 and the ground line 106 in the first state $\varphi_I$, $V_{IN}=V_{C1}+V_{C2}$ holds. $V_{C1}$ is a voltage across the first capacitor C1, and $V_{C2}$ is a voltage across the second capacitor C2. In the first state $\varphi_I$, the voltage $V_{C2}$ increases with time, and the voltage $V_{C1}$ decreases with time.

The voltage of the connection node n3 of the third transistor M3 and the fourth transistor M4 is $V_{n3}=V_{IN}-V_{C2}$. The voltage $\Delta V_{L(\varphi I)}$ across the first inductor L1 is expressed as $\Delta V_{L(\varphi I)}=V_{IN}-V_{C2}-V_{OUT}$. As described later, when $V_{C1}=V_{C2}=V_{IN}/2$, $\Delta V_{L(\varphi I)}=V_{IN}/2-V_{OUT}$ The coil current $I_L$ flowing through the first inductor L1 increases with the slope of $\Delta V_{L(\varphi I)}/L1=(V_{IN}/2-V_{OUT})/L1$.

Figure 23:
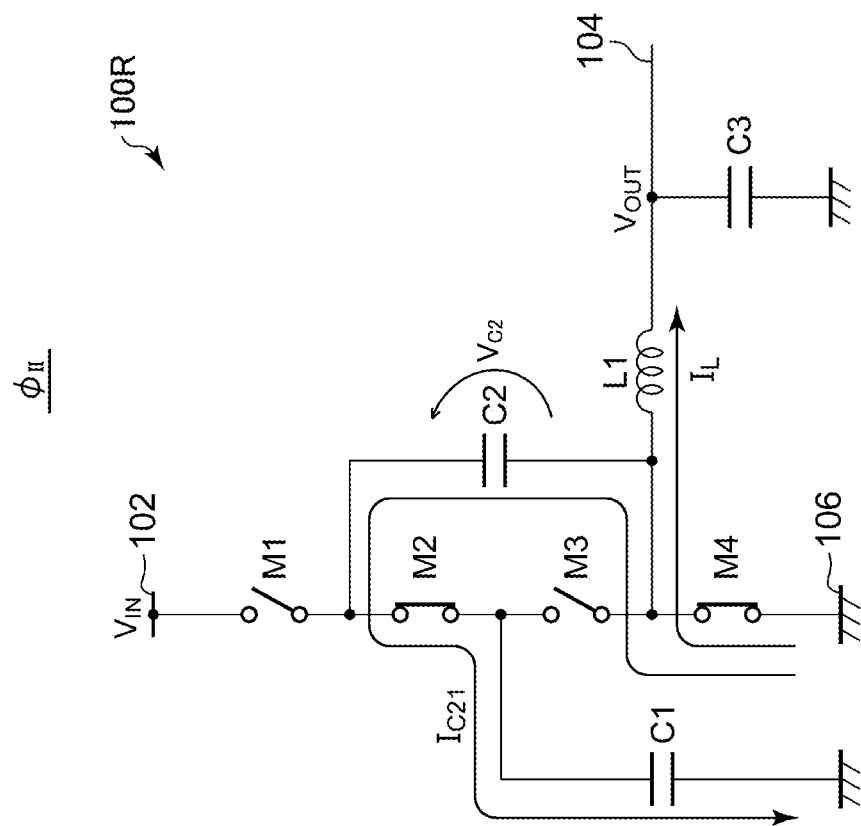
FIG. 23 is an equivalent circuit diagram in the second state $\varphi_H$ of the switching converter according to the comparative technique.

FIG. 23 is an equivalent circuit diagram of the second state $\varphi_{II}$ of the switching converter 100R according to the comparative technique. In the second state $\varphi_{II}$, the voltage of the connection node n3 of the third transistor M3 and the fourth transistor M4 is 0 V. A voltage $\Delta V_{L(\varphi II)}$ across the first inductor L1 is $\Delta V_{L(\varphi II)}=-V_{OUT}$. The coil current $I_L$ flowing through the first inductor L1 decreases with the slope of $\Delta V_{L(\varphi II)}/L1=-V_{OUT}/L1$.

In the second state $\varphi_{II}$, the coil current $I_L$ flows through the first inductor L1. In addition, the current $I_{C21}$ flows from the second capacitor C2 to the first transistor M1 via the second transistor M2, charges are transferred from the second capacitor C2 to the first capacitor C1, the second capacitor C2 is discharged, and the first capacitor C1 is charged. When C1=C2, $V_{C1}=V_{C2}=V_{IN}/2$ is obtained as a result of charge transfer.

Figure 24:
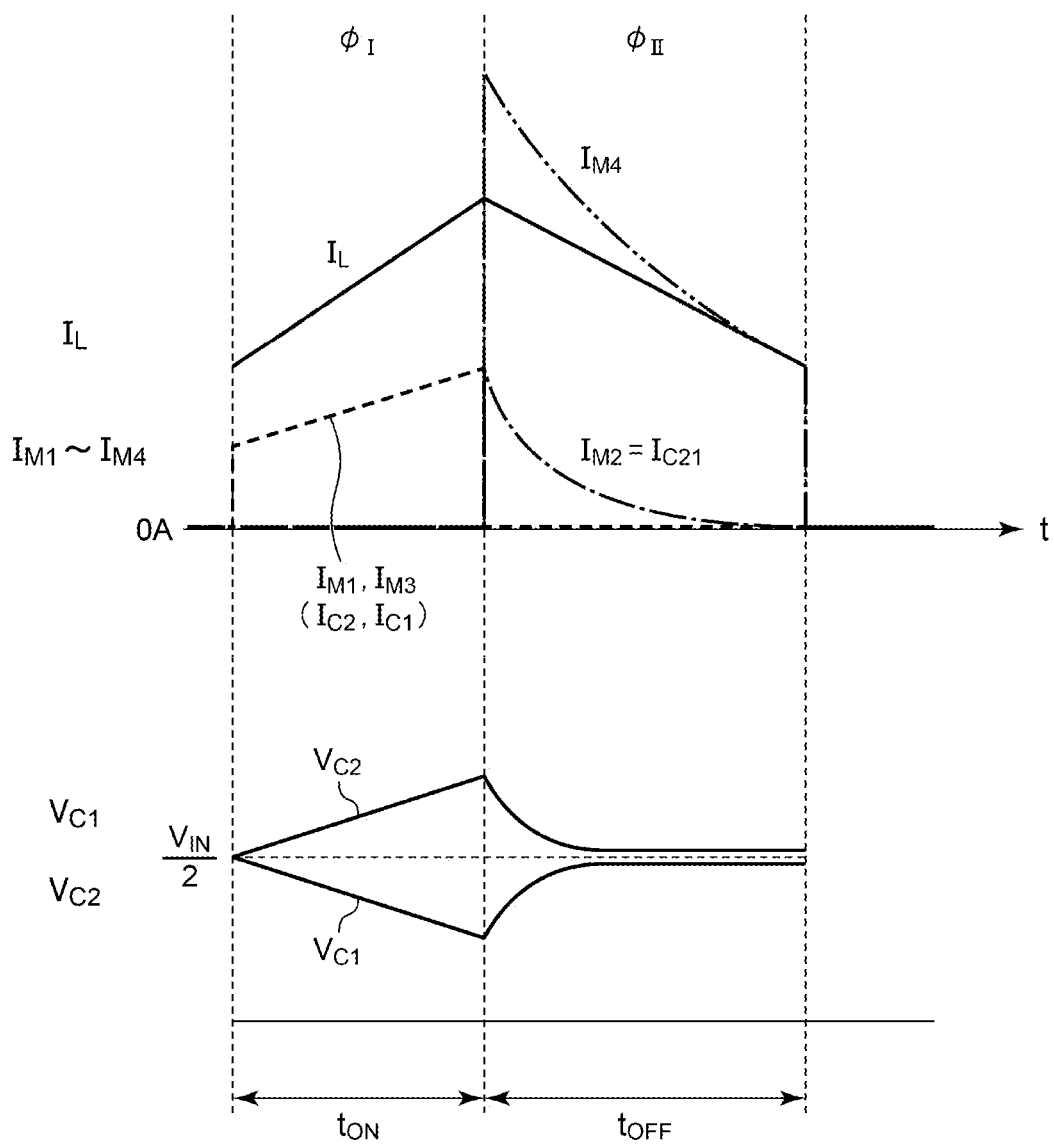
FIG. 24 is an operation waveform diagram of the switching converter according to the comparative technique.

FIG. 24 is an operation waveform diagram of the switching converter 100R according to the comparative technique. FIG. 24 illustrates waveforms for one switching cycle of the coil current $I_L$ and the currents $I_{M1}$ to $I_{M4}$ flowing through the first transistor M1 to the fourth transistor M4.

In the first state $\varphi_I$, the current $I_{M1}$ corresponds to the current $I_{C2}$, and the current $I_{M3}$ corresponds to the current $I_{C1}$. The coil current $I_L$ is the sum of $I_{M1}$ and $I_{M3}$. In the second state $\varphi_{II}$, $I_{M2}$ corresponds to the $I_{C21}$, and the current $I_{M4}$ is the sum of $I_L$ and $I_{M2}$.

The length of the first state $\varphi_I$ is set to $t_{ON}$, and the length of the second state $\varphi_{II}$ is set to $t_{OFF}$. In the steady state, the change amount of the coil current $I_L$ is equal between the first state $\varphi_I$ and the second state $\varphi_{II}$.

$(V_{IN}/2-V_{OUT})/L1 \times t_{ON}=V_{OUT}/L \times t_{OFF}$

When $d=t_{ON}/(t_{ON}+t_{OFF})$, $(V_{IN}/2-V_{OUT}) \times d = V_{OUT} \times (1-d)$ is obtained. Therefore, in a steady state, $V_{OUT}=d \times V_{IN}/2$ is established. The output voltage $V_{OUT}$ can be controlled in the range of 0 to $V_{IN}/2$ according to the duty cycle d.

Immediately after the transition from the first state $\varphi_I$ to the second state $\varphi_{II}$, the current $I_{M2}=I_{C21}$ flows via the second transistor M2. When the potential difference between the voltages $V_{C1}$ and $V_{C2}$ immediately before the transition is large, a large spike-like current $I_{M2}$ flows immediately after the transition. The loss (switched capacitor loss) generated in the second transistor M2 is $P=(4C \cdot f)^{-1} \cdot I_{OUT}^2$. C is a combined capacitance of the first capacitor C1 and the second capacitor C2, and f is a switching frequency. The switching converter 100R according to the comparative technique has a problem that the loss increases due to the spike of the current $I_{M2}$ immediately after the transition to $\varphi_{II}$. Hereinabove, the problem of the comparative technique has been described.

Next, an operation of the switching converter 100 will be described. The operation of the switching converter 100 is basically similar to that of the switching converter 100R according to the comparative technique.

Figure 25:
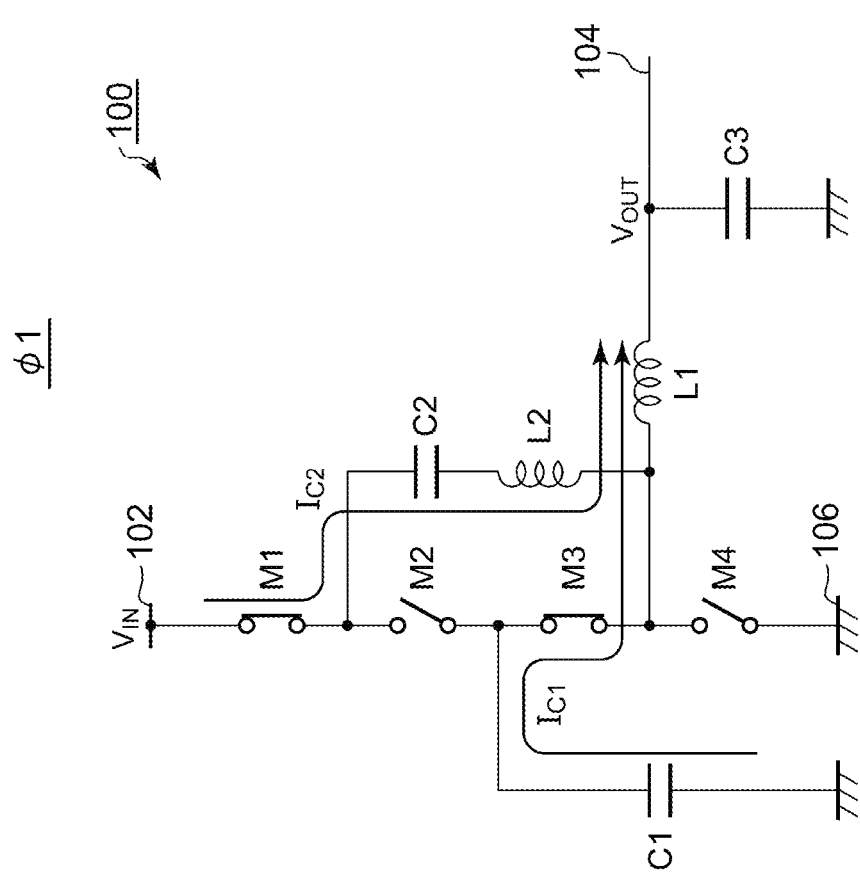
FIG. 25 is an equivalent circuit diagram in the first state $\varphi 1$ of the switching converter of FIG. 20.

FIG. 25 is an equivalent circuit diagram of the first state φ1 of the switching converter 100 of FIG. 20. In the first state φ1, the charging current Ice of the second capacitor C2 and the discharging current $I_{C1}$ of the first capacitor C1 flow through the first inductor L1.

The coil current $I_L$ flowing through the first inductor L1 increases with the slope of $\Delta V_{L(\varphi 1)}/L1=(V_{IN}/2-V_{OUT})/L1$.

Figure 26:
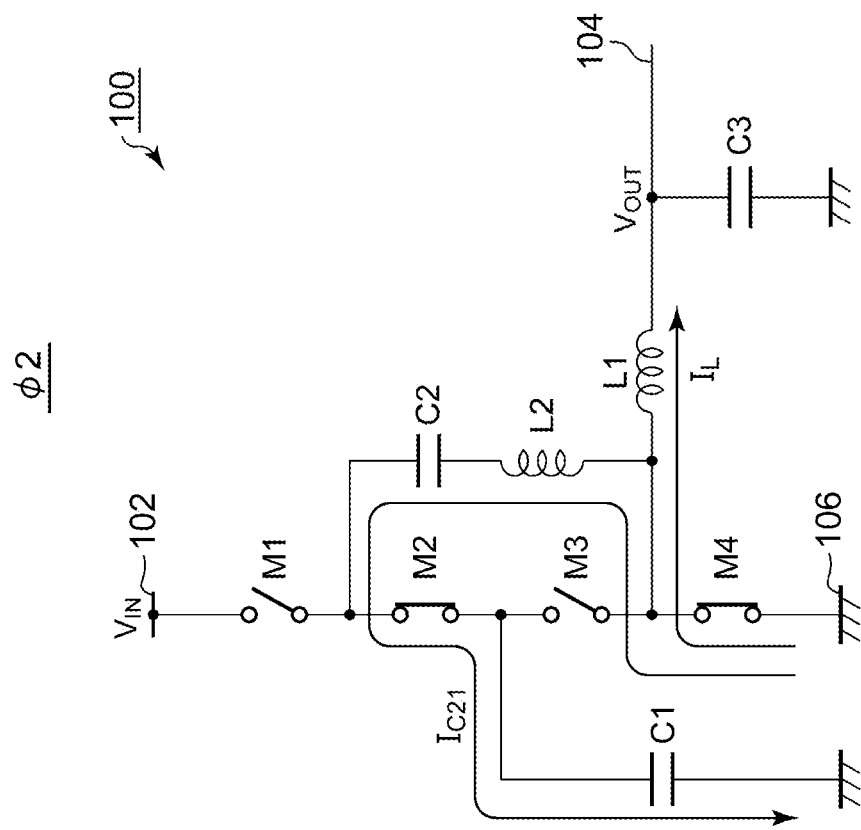
FIG. 26 is an equivalent circuit diagram in the second state $\varphi 2$ of the switching converter of FIG. 20.

FIG. 26 is an equivalent circuit diagram of the second state φ2 of the switching converter 100 of FIG. 20. A voltage $\Delta V_{L(\varphi II)}$ across the first inductor L1 is $\Delta V_{L(\varphi II)}=-V_{OUT}$.

The coil current $I_L$ flowing through the first inductor L1 decreases with the slope of $\Delta V_{L(\varphi 2)}/L1=-V_{OUT}/L1$.

In the second state φ2, the coil current $I_L$ flows through the first inductor L1. In addition, the current $I_{C21}$ flows from the second capacitor C2 to the first transistor M1 via the second transistor M2, and the charge is transferred from the second capacitor C2 to the first capacitor C1. The current $I_{C21}$ of FIG. 26 is different from the current $I_{C21}$ of FIG. 23 in that the current $I_{C21}$ passes through the second inductor L2.

Also in the switching converter 100 of FIG. 20, in a steady state, $V_{OUT}=d \times V_{IN}/2=V_{OUT}$ is established. That is, the output voltage $V_{OUT}$ can be controlled in a range of 0 to $V_{IN}/2$ according to the duty cycle d.

Figure 27:
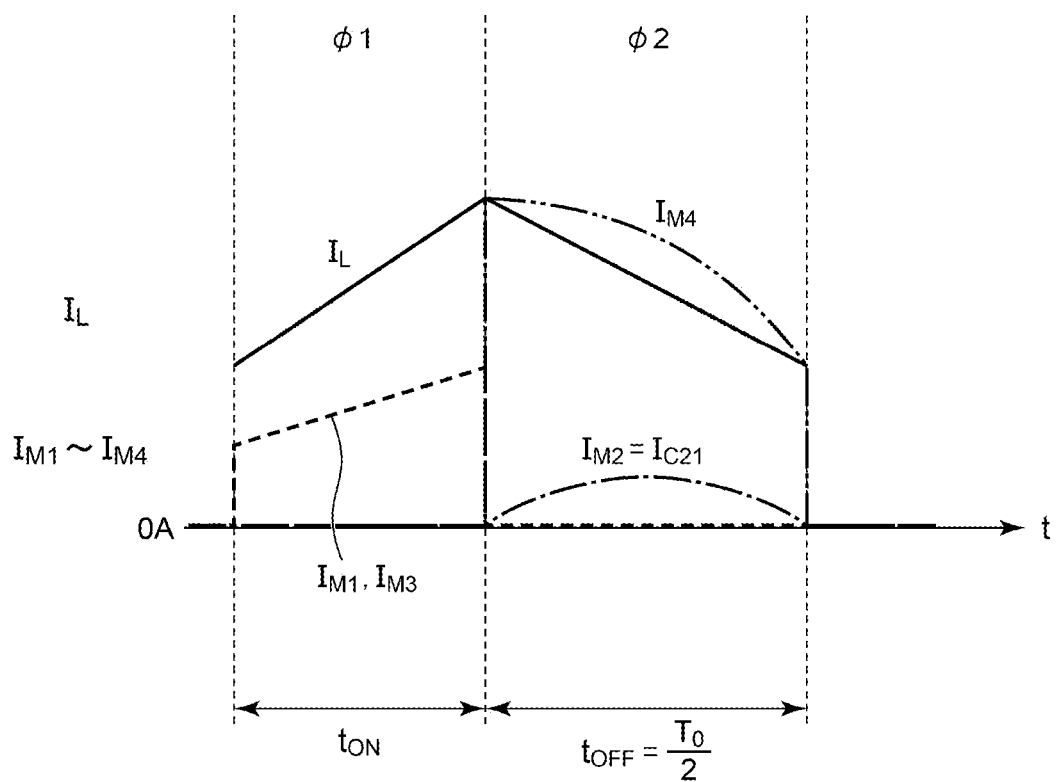
FIG. 27 is an operation waveform diagram of the switching converter of FIG. 20.

FIG. 27 is an operation waveform diagram of the switching converter 100 of FIG. 20. FIG. 27 illustrates a waveform corresponding to one switching cycle of the coil current $I_L$.

After the transition from the first state φ1 to the second state φ2, the current $I_{M2}$=flows via the second transistor M2. As described above, the current $I_{M2}=I_{C21}$ passes through the second inductor L2. By the second inductor L2, the current $I_{M2}(=I_{C21})$ gradually increases and gradually decreases in the second state φ2, and a spike of the current $I_{C21}$ immediately after the transition to the second state φ2 is suppressed. This can reduce switched capacitor loss.

The length $t_{OFF}$ of the second state φ2 is preferably approximately ½ times the natural period $T_0$, which is the reciprocal of the resonant frequency of the LC resonant circuit formed by the first capacitor C1, the second capacitor C2, and the second inductor L2. As a result, the operation can be performed in the resonant state, and the efficiency can be further improved.

Modification

A modification related to Embodiment 3 will be described.

Modification 3.1

In Embodiment 3.1, the controller IC 200 alternately switches between the first state φ1 and the second state φ2, but the present disclosure is not limited thereto. For example, in the light load state, three states of the third state φ3 may be switched in addition to the first state φ1 and the second state φ2. The third state φ3 is a high-impedance state in which all the transistors M1 to M4 are turned off.

Modification 3.2, Modification 3.3

The insertion of the second inductor L2 is not limited to the position in FIG. 20, and the second inductor L2 may be inserted on the path of the current $I_{C21}$ in the second state φ2. For example, the positions of the second capacitor C2 and the second inductor L2 may be interchanged, or the second capacitor C2 and the second inductor L2 may be inserted in other places.

Figure 28:
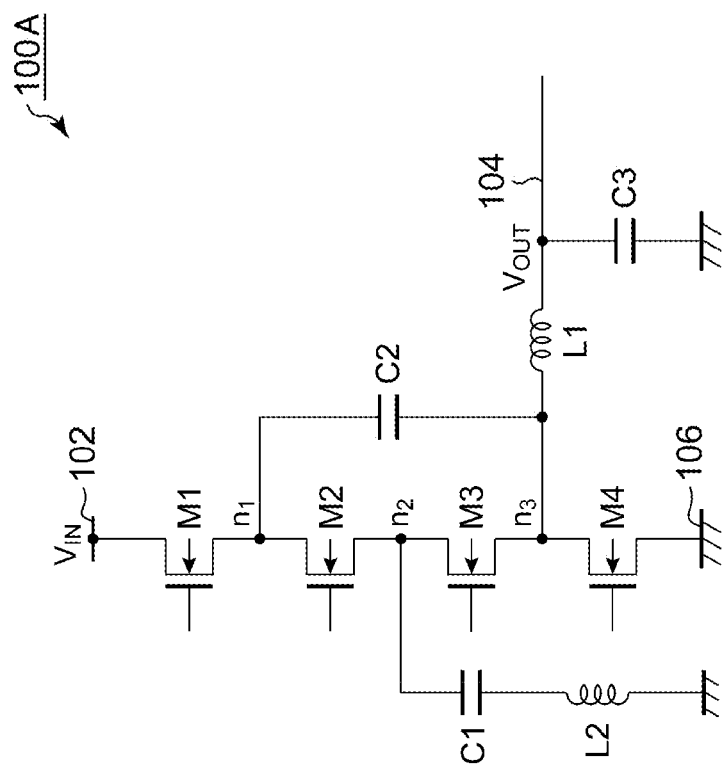
FIG. 28 is a circuit diagram of a switching converter according to Modification 3.2.

FIG. 28 is a circuit diagram of a switching converter 100A according to Modification 3.2. In this modification, the second inductor L2 is connected in series with the second transistor M2 between the switching nodes n1 and n2. Also in this case, in the second state φ2, the peak of the current $I_{C21}$ flowing through the second transistor M2 can be suppressed, and the efficiency can be improved.

Figure 29:
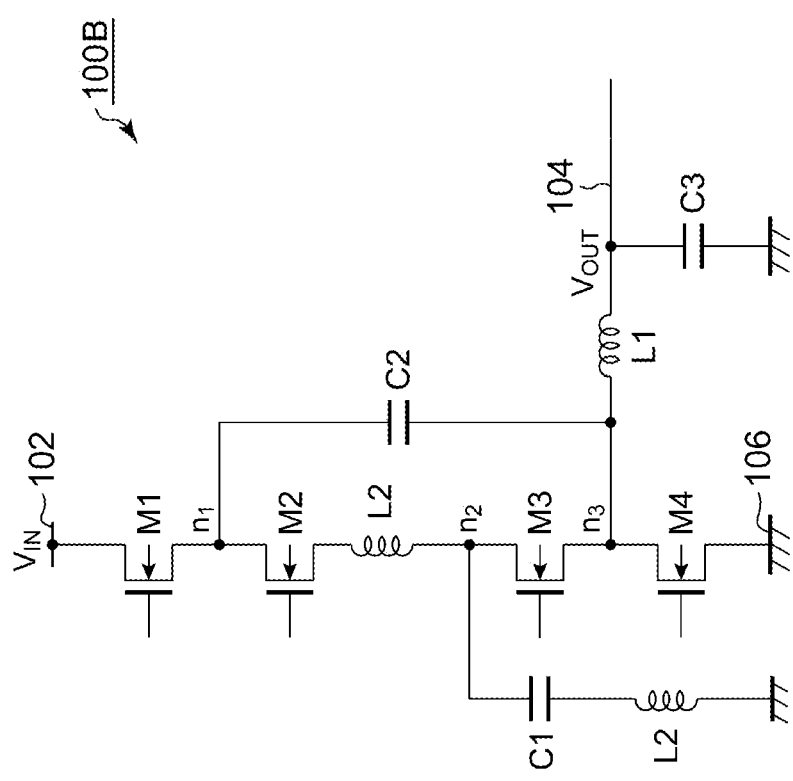
FIG. 29 is a circuit diagram of a switching converter according to Modification 3.3.

FIG. 29 is a circuit diagram of a switching converter 100B according to Modification 3.3. In this modification, the second inductor L2 is connected in series with the first capacitor C1 between the switching node n2 and the ground line 106. The first capacitor C1 and the second inductor L2 may be interchanged. In Modification 3.3, since the current $I_{C1}$ in the first state φ1 also passes through the second inductor L2, the current $I_{C1}$ is also affected.

Application

Figure 30:
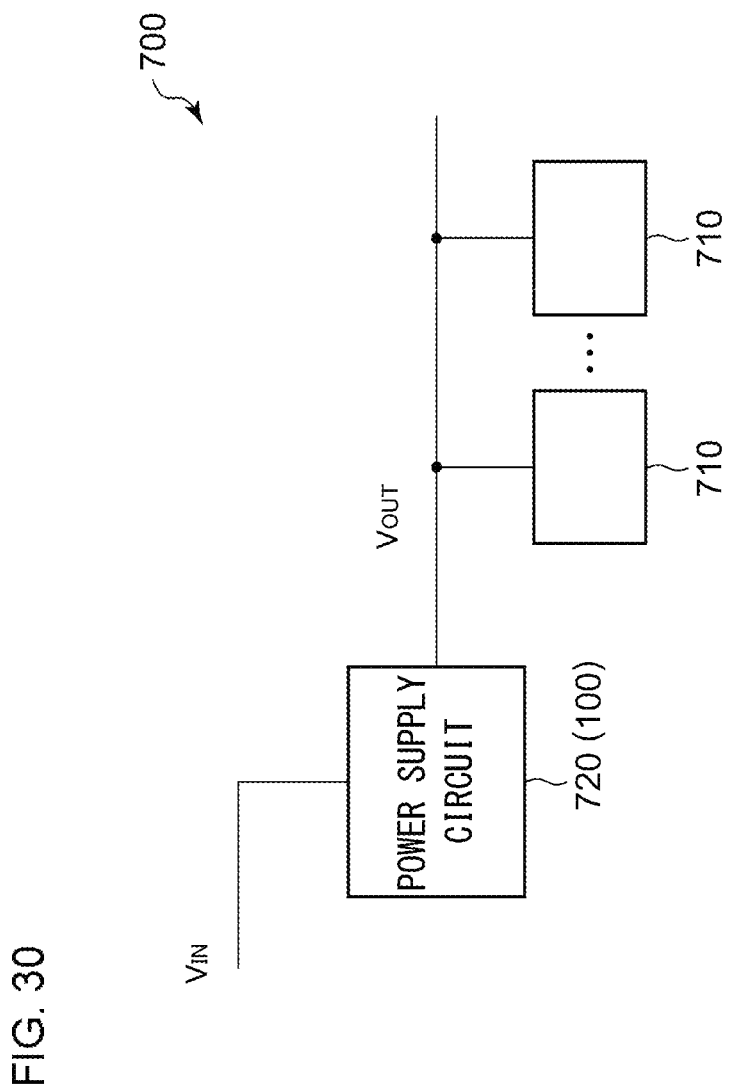
FIG. 30 is a view illustrating an example of an electronic device including the switching converter.

FIG. 30 is a diagram illustrating an example of an electronic device 700 including the switching converter 100. The electronic device 700 includes an internal circuit 710 and a power supply circuit 720. The internal circuit 710 may include a central processing unit (CPU), a memory, an interface circuit of a local area network (LAN), and the like. The power supply circuit 720 steps up (or steps down) the input voltage $V_{IN}$ and supplies the input voltage $V_{IN}$ to the internal circuit 710. The above-described step-up/down converter 100 can be used as the power supply circuit 720.

The electronic device 700 is not limited to the server and may be an in-vehicle device. In addition, the electronic device 700 may be an industrial device, an office automation (OA) device, or a consumer device such as an audio device.

APPENDIX

1. The technology related to Embodiment 1 and FIG. 1 to FIG. 9 can be understood as follows.

Item 1.1

A switching converter, comprising:
an input line;
an output line;
a ground line;
a switching node;
an inductor connected between the switching node and the output line;
an output capacitor connected to the output line;
a first switch and a second switch connected in series between the input line and the ground line;
a third switch connected between the switching node and the input line;
a flying capacitor connected across the third switch and the first switch; and
a controller circuit structured to drive the first switch to the third switch.

Item 1.2

The switching converter according to Item 1.1, wherein the controller circuit alternately repeats:
a first state in which the second switch and the third switch are turned on and the first switch is turned off; and
a second state in which the second switch and the third switch are turned off and the first switch is turned on.

Item 1.3

The switching converter according to Item 1.1 or 1.2, wherein the first switch to the third switch are N-channel MOSFETs.

Item 1.4

A controller circuit for a switching converter, the switching converter including:
an input line;
an output line;
a ground line;
a switching node;
an inductor connected between the switching node and the output line;
an output capacitor connected to the output line;
a first switch and a second switch connected in series between the input line and the ground line;
a third switch connected between the switching node and the input line; and
a flying capacitor connected across the third switch and the first switch, the controller circuit comprising:
a state control unit structured to alternately repeat a first state in which the second switch and the third switch are turned on and the first switch is turned off, and a second state in which the second switch and the third switch are turned off and the first switch is turned on; and
a drive circuit structured to drive the first switch to the third switch according to an output of the state control unit.

Item 1.5

A switching converter comprising:
an input line;
an output line;
a ground line;
a switching node;
an inductor connected between the switching node and the output line;
an output capacitor connected to the output line;
a first switch and a second switch connected in series between the input line and the ground line;
a third switch and a fourth switch connected in series between the input line and the switching node;
a flying capacitor connected across the third switch and the first switch;
a fifth switch connected between the switching node and the ground line; and
a controller circuit structured to drive the first switch to the fifth switch.

Item 1.6

The switching converter according to Item 1.5, wherein the controller circuit alternately repeats:
a first state in which the first switch and the fourth switch are turned off and the second switch, the third switch, and the fifth switch are turned on; and a second state in which the first switch and the fourth switch are turned on and the second switch, the third switch, and the fifth switch are turned off.

Item 1.7

The switching converter according to Item 1.5 or 1.6, wherein the first switch to the fifth switch are N-channel MOSFETs.

Item 1.8

A controller circuit for a switching converter, the switching converter including:

an input line;

an output line;

a ground line;

a switching node;

an inductor connected between the switching node and the output line;

an output capacitor connected to the output line;

a first switch and a second switch connected in series between the input line and the ground line;

a third switch and a fourth switch connected in series between the input line and the switching node;

a flying capacitor connected across the third switch and the first switch; and a fifth switch connected between the switching node and the ground line, the controller circuit comprising:

a state control unit structured to alternately repeat a first state in which the first switch and the fourth switch are turned off and the second switch, the third switch, and the fifth switch are turned on, and a second state in which the first switch and the fourth switch are turned on and the second switch, the third switch, and the fifth switch are turned off; and a drive circuit structured to drive the first switch to the fifth switch according to an output of the state control unit.

Item 1.9

The controller circuit according to Item 1.4 or 1.8, which is monolithically integrated on one semiconductor substrate.

Item 1.10

A switching converter comprising the controller circuit according to Item 1.4 or 1.8.

Item 1.11

An electronic device comprising the switching converter according to any one of Items 1.1 to 1.3, 1.5 to 1.7, and 1.10.

2. The technology related to Embodiment 2 and FIG. 10 to FIG. 19 can be understood as follows.

Item 2.1

A controller circuit for a step-up/down converter, the step-up/down converter including:

an input line;

an output line;

a ground line;

an inductor;

a first transistor connected between the input line and a first end of the inductor;

a second transistor connected between the first end of the inductor and the ground line;

a third transistor connected between a second end of the inductor and the ground line; and a fourth transistor connected between the second end of the inductor and the output line, the controller circuit comprising:

a state control unit structured to repeat, in a step-up mode, (i) a first state in which the first transistor is turned on, the second transistor is turned off, the third transistor is turned on, and the fourth transistor is turned off, (ii) a second state in which the first transistor is turned on, the second transistor is turned off, the third transistor is turned off, and the fourth transistor is turned on, and (iii) a third state in which the first transistor is turned off, the second transistor is turned on, the third transistor is turned on, and the fourth transistor is turned off; and a drive circuit structured to drive the first transistor to the fourth transistor according to an output of the state control unit.

Item 2.2

The controller circuit according to Item 2.1, wherein, in the step-down mode, the state control unit repeats (iv) a fourth state in which the first transistor is turned on, the second transistor is turned off, the third transistor is turned off, and the fourth transistor is turned on, (v) a fifth state in which the first transistor is turned off, the second transistor is turned on, the third transistor is turned off, and the fourth transistor is turned on, and (vi) a sixth state in which the first transistor is turned off, the second transistor is turned on, the third transistor is turned on, and the fourth transistor is turned off.

Item 2.3

The controller circuit according to Item 2.1, wherein, in the step-down mode, the state control unit repeats (iv) a fourth state in which the first transistor is turned on, the second transistor is turned off, the third transistor is turned off, and the fourth transistor is turned on, and (v) a fifth state in which the first transistor is turned off, the second transistor is turned on, the third transistor is turned off, and the fourth transistor is turned on.

Item 2.4

The controller circuit according to any one of Items 2.1 to 2.3, which is monolithically integrated on one semiconductor substrate.

Item 2.5

A step-up/down converter comprising the controller circuit according to any one of Items 2.1 to 2.4.

Item 2.6

An electronic device comprising the step-up/down converter according to Item 2.5.

3. The technology related to Embodiment 3 and FIG. 20 to FIG. 30 can be understood as follows.

Item 3.1

A switching converter comprising:

an input line;

an output line;

a ground line;

a first transistor, a second transistor, a third transistor, and a fourth transistor connected in series between the input line and the ground line;

a first capacitor connected between a connection node of the second transistor and the third transistor and the ground line;

a second capacitor connected between a connection node of the first transistor and the second transistor and a connection node of the third transistor and the fourth transistor;

a first inductor connected between a connection node of the third transistor and the fourth transistor and the output line;
an output capacitor connected to the output line;
a second inductor provided on a loop that returns from the ground line to the ground line via the fourth transistor, the second capacitor, the second transistor, and the first capacitor; and
a controller circuit structured to drive the first transistor to the fourth transistor.

Item 3.2
The switching converter according to Item 3.1, wherein the second inductor is connected in series with the second capacitor across the second transistor and the third transistor.

Item 3.3
The switching converter according to Item 3.1, wherein the second inductor is connected in series with the second transistor between the connection node of the first transistor and the second transistor and the connection node of the second transistor and the third transistor.

Item 3.4
The switching converter according to Item 3.1, wherein the second inductor is connected in series with the first capacitor between the connection node of the second transistor and the third transistor and the ground line.

Item 3.5
The switching converter according to any one of Items 3.1 to 3.4, wherein an inductance of the second inductor is smaller than an inductance of the first inductor.

Item 3.6
The switching converter according to any one of Items 3.1 to 3.5, wherein the first transistor to the fourth transistor are N-channel MOSFETs (Metal Oxide Semiconductor Field Effect Transistor).

Item 3.7
The switching converter according to any one of Items 3.1 to 3.6, wherein the controller circuit alternately repeats a first state in which the first transistor and the third transistor are turned on and the second transistor and the fourth transistor are turned off and a second state in which the first transistor and the third transistor are turned off and the second transistor and the fourth transistor are turned on are alternately repeated.

Item 3.8
The switching converter according to Item 3.7, wherein a length of the second state is approximately ½ times a natural period that is a reciprocal of a resonant frequency of an LC resonant circuit formed by the first capacitor, the second capacitor, and the second inductor.

Item 3.9
A controller circuit of a switching converter, the switching converter including:
an input line;
an output line;
a ground line;
a first transistor, a second transistor, a third transistor, and a fourth transistor connected in series between the input line and the ground line;
a first capacitor connected between a connection node of the second transistor and the third transistor and the ground line;
a second capacitor connected between a connection node of the first transistor and the second transistor and a connection node of the third transistor and the fourth transistor;
a first inductor connected between a connection node between the third transistor and the fourth transistor and the output line;
an output capacitor connected to the output line; and
a second inductor provided on a loop that returns from the ground line to the ground line via the fourth transistor, the second capacitor, the second transistor, and the first capacitor, the controller circuit comprising:
a state control unit structured to alternately repeat a first state in which the first transistor and the third transistor are turned on and the second transistor and the fourth transistor are turned off, and a second state in which the first transistor and the third transistor are turned off and the second transistor and the fourth transistor are turned on; and
a drive circuit structured to drive the first transistor to the fourth transistor according to an output of the state control unit.

Item 3.10
The controller circuit according to Item 3.9, wherein a length of the second state is approximately ½ times a natural period that is a reciprocal of a resonant frequency of an LC resonant circuit formed by the first capacitor, the second capacitor, and the second inductor.

Item 3.11
The controller circuit according to Item 3.9 or 3.10, which is monolithically integrated on one semiconductor substrate.

Item 3.12
A switching converter comprising the controller circuit according to any one of Items 3.9 to 3.11.

Item 3.13
An electronic device comprising the switching converter according to any one of Items 3.1 to 3.8, and 3.12.

While the preferred embodiments of the present invention have been described using specific terms, such description is for illustrative purposes only, and it is to be understood that changes and variations may be made without departing from the spirit or scope of the appended claims.

What is claimed is:
1. A switching converter comprising:
an input line;
an output line;
a ground line;
a switching node;
an inductor having a first end directly coupled to the switching node and a second end coupled to the output line;
an output capacitor connected to the output line;
a first switch and a second switch connected in series between the input line and the ground line;
a third switch having a first end directly coupled to the switching node and a second node coupled to the input line;
a flying capacitor connected across the third switch and the first switch, wherein one end of the flying capacitor is directly coupled to the switching node; and
a controller circuit structured to drive the first switch to the third switch, wherein the controller circuit alternately repeats:

a first state in which the second switch and the third switch are turned on and the first switch is turned off; and a second state in which the second switch and the third switch are turned off and the first switch is turned on.

2. An electronic device comprising the switching converter according to claim 1.

3. The switching converter according to claim 1, wherein the first switch to the third switch are N-channel MOSFETs.

4. A controller circuit for a switching converter, the switching converter including:
   an input line;
   an output line;
   a ground line;
   a switching node;
   an inductor having a first end directly coupled to the switching node and a second end coupled to the output line;
   an output capacitor connected to the output line;
   a first switch and a second switch connected in series between the input line and the ground line;
   a third switch having a first end directly coupled to the switching node and a second end coupled to the input line; and
   a flying capacitor connected across the third switch and the first switch, wherein one end of the flying capacitor is directly coupled to the switching node, the controller circuit comprising:
   a state control unit structured to alternately repeat a first state in which the second switch and the third switch are turned on and the first switch is turned off, and a second state in which the second switch and the third switch are turned off and the first switch is turned on; and
   a drive circuit structured to drive the first switch to the third switch according to an output of the state control unit.

5. The controller circuit according to claim 4, which is monolithically integrated on one semiconductor substrate.

6. The switching converter comprising the controller circuit according to claim 4.

7. A switching converter comprising:
   an input line;
   an output line;
   a ground line;
   a switching node;
   an inductor connected between the switching node and the output line;
   an output capacitor connected to the output line;
   a first switch and a second switch connected in series between the input line and the ground line;
   a third switch and a fourth switch connected in series between the input line and the switching node;
   a flying capacitor connected across the third switch and the first switch;
   a fifth switch having a first end directly coupled to the switching node and a second end directly coupled to the ground line; and
   a controller circuit structured to drive the first switch to the fifth switch.

8. The switching converter according to claim 7, wherein the controller circuit alternately repeats:
   a first state in which the first switch and the fourth switch are turned off and the second switch, the third switch, and the fifth switch are turned on; and
   a second state in which the first switch and the fourth switch are turned on and the second switch, the third switch, and the fifth switch are turned off.

9. The switching converter according to claim 7, wherein the first switch to the fifth switch are N-channel MOSFETs.

10. A controller circuit for a switching converter, the switching converter including:
    an input line;
    an output line;
    a ground line;
    a switching node;
    an inductor connected between the switching node and the output line;
    an output capacitor connected to the output line;
    a first switch and a second switch connected in series between the input line and the ground line;
    a third switch and a fourth switch connected in series between the input line and the switching node;
    a flying capacitor connected across the third switch and the first switch; and
    a fifth switch having a first end directly coupled to the switching node and a second end directly coupled to the ground line, the controller circuit comprising:
    a state control unit structured to alternately repeat a first state in which the first switch and the fourth switch are turned off and the second switch, the third switch, and the fifth switch are turned on, and a second state in which the first switch and the fourth switch are turned on and the second switch, the third switch, and the fifth switch are turned off; and
    a drive circuit structured to drive the first switch to the fifth switch according to an output of the state control unit.

11. The controller circuit according to claim 10, which is monolithically integrated on one semiconductor substrate.

12. The switching converter comprising the controller circuit according to claim 11.

13. An electronic device comprising the switching converter according to claim 6.

14. An electronic device comprising the switching converter according to claim 7.

15. An electronic device comprising the switching converter according to claim 12.

* * * * *